(12) United States Patent
Coleman et al.

(10) Patent No.: US 8,300,499 B2
(45) Date of Patent: Oct. 30, 2012

(54) LINEAR AND CIRCULAR DOWNSCAN IMAGING SONAR

(75) Inventors: Aaron R. Coleman, Broken Arrow, OK (US); Jeffrey W. Hanoch, Broken Arrow, OK (US); Brian T. Maguire, Broken Arrow, OK (US)

(73) Assignee: Navico, Inc., Tulsa, OK (US)

( * ) Notice: Subject to any disclaimer, the term of this patent is extended or adjusted under 35 U.S.C. 154(b) by 265 days.

(21) Appl. No.: 12/460,093

(22) Filed: Jul. 14, 2009

(65) Prior Publication Data

US 2011/0013484 A1  Jan. 20, 2011

(51) Int. Cl.
*G01S 15/00* (2006.01)
(52) U.S. Cl. ......................................... 367/88
(58) Field of Classification Search ............ 367/87, 367/88
See application file for complete search history.

(56) References Cited

U.S. PATENT DOCUMENTS

| | | |
|---|---|---|
| 1,823,329 A | 9/1931 | Marrison |
| 2,416,338 A | 2/1947 | Mason |
| 3,005,973 A | 10/1961 | Kietz |
| 3,090,030 A | 5/1963 | Schuck |
| 3,142,032 A | 7/1964 | Jones |
| 3,144,631 A | 8/1964 | Lustig et al. |
| 3,296,579 A | 1/1967 | Farr et al. |
| 3,359,537 A | 12/1967 | Geil et al. |
| 3,381,264 A | 4/1968 | Lavergne et al. |
| 3,451,038 A | 6/1969 | Maass |
| 3,458,854 A | 7/1969 | Murphree |
| 3,484,737 A | 12/1969 | Walsh |
| 3,553,638 A | 1/1971 | Sublett |
| 3,585,578 A | 6/1971 | Fischer, Jr. |
| 3,585,579 A | 6/1971 | Dorr et al. |
| 3,618,006 A | 11/1971 | Wright |
| 3,624,596 A | 11/1971 | Dickenson et al. |
| 3,716,824 A | 2/1973 | Dorr et al. |
| 3,742,436 A | 6/1973 | Jones |
| 3,757,287 A | 9/1973 | Bealor, Jr. |
| 3,895,339 A | 7/1975 | Jones et al. |
| 3,895,340 A | 7/1975 | Gilmour |
| 3,898,608 A | 8/1975 | Jones et al. |
| 3,949,348 A | 4/1976 | Dorr |

(Continued)

FOREIGN PATENT DOCUMENTS

GB   1316138   5/1973

(Continued)

OTHER PUBLICATIONS

Farrell, Edward J.; , "Color Display and Interactive Interpretation of Three-Dimensional Data," IBM Journal of Research and Development , vol. 27, No. 4, pp. 356-366, Jul. 1983.*

(Continued)

*Primary Examiner* — Isam Alsomiri
*Assistant Examiner* — James Hulka
(74) *Attorney, Agent, or Firm* — Alston & Bird LLP

(57) ABSTRACT

A method for providing a combined linear and circular downscan sonar display may include receiving linear downscan sonar data from a linear downscan transducer, receiving conical downscan sonar data from a circular downscan transducer, and combining the linear downscan sonar data and the conical downscan sonar data to produce combined downscan sonar data. A corresponding computer program product and apparatus are also provided.

81 Claims, 17 Drawing Sheets
(5 of 17 Drawing Sheet(s) Filed in Color)

U.S. PATENT DOCUMENTS

| | | | |
|---|---|---|---|
| 3,950,723 A | 4/1976 | Gilmour | |
| 3,953,828 A | 4/1976 | Cook | |
| 3,964,424 A | 6/1976 | Hagemann | |
| 3,967,234 A | 6/1976 | Jones | |
| 3,975,704 A | 8/1976 | Klein | |
| 4,030,096 A | 6/1977 | Stevens et al. | |
| 4,047,148 A | 9/1977 | Hagemann | |
| 4,052,693 A | 10/1977 | Gilmour | |
| 4,063,212 A | 12/1977 | Sublett | |
| 4,068,209 A | 1/1978 | Lagier | |
| 4,075,599 A | 2/1978 | Kosalos et al. | |
| 4,184,210 A | 1/1980 | Hagemann | |
| 4,197,591 A | 4/1980 | Hagemann | |
| 4,198,702 A | 4/1980 | Clifford | |
| 4,199,746 A | 4/1980 | Jones et al. | |
| 4,200,922 A | 4/1980 | Hagemann | |
| 4,204,281 A | 5/1980 | Hagemann | |
| 4,207,620 A | 6/1980 | Morgera | |
| 4,216,537 A | 8/1980 | Delignieres | |
| 4,232,380 A | 11/1980 | Caron et al. | |
| 4,247,923 A | 1/1981 | De Kok | |
| 4,262,344 A | 4/1981 | Gilmour | |
| 4,287,578 A | 9/1981 | Heyser | |
| RE31,026 E | 9/1982 | Shatto | |
| 4,422,166 A | 12/1983 | Klein | |
| 4,456,210 A | 6/1984 | McBride | |
| 4,493,064 A | 1/1985 | Odero et al. | |
| 4,538,249 A | 8/1985 | Richard | |
| 4,635,240 A | 1/1987 | Geohegan, Jr. et al. | |
| 4,641,290 A | 2/1987 | Massa et al. | |
| 4,642,801 A | 2/1987 | Perny | |
| 4,751,645 A | 6/1988 | Abrams et al. | |
| 4,774,837 A | 10/1988 | Bird | |
| 4,796,238 A | 1/1989 | Bourgeois et al. | |
| 4,802,148 A | 1/1989 | Gilmour | |
| 4,815,045 A | 3/1989 | Nakamura | |
| 4,855,961 A | 8/1989 | Jaffe et al. | |
| 4,879,697 A | 11/1989 | Lowrance et al. | |
| 4,907,208 A | 3/1990 | Lowrance et al. | |
| 4,912,685 A | 3/1990 | Gilmour | |
| 4,924,448 A | 5/1990 | Gaer | |
| 4,935,906 A | 6/1990 | Baker et al. | |
| 4,939,700 A | 7/1990 | Breton | |
| 4,958,330 A | 9/1990 | Higgins | |
| 4,970,700 A | 11/1990 | Gilmour et al. | |
| 4,975,887 A | 12/1990 | Maccabee et al. | |
| 4,982,924 A | 1/1991 | Havins | |
| 5,033,029 A | 7/1991 | Jones | |
| 5,109,364 A | 4/1992 | Stiner | |
| 5,113,377 A | 5/1992 | Johnson | |
| 5,142,502 A | 8/1992 | Wilcox et al. | |
| D329,615 S | 9/1992 | Stiner | |
| D329,616 S | 9/1992 | Stiner | |
| 5,155,706 A | 10/1992 | Haley et al. | |
| 5,182,732 A | 1/1993 | Pichowkin | |
| 5,184,330 A | 2/1993 | Adams et al. | |
| 5,200,931 A * | 4/1993 | Kosalos et al. | 367/88 |
| 5,214,744 A | 5/1993 | Schweizer et al. | |
| 5,241,314 A | 8/1993 | Keeler et al. | |
| 5,243,567 A | 9/1993 | Gingerich | |
| 5,245,587 A * | 9/1993 | Hutson | 367/100 |
| 5,257,241 A | 10/1993 | Henderson et al. | |
| 5,260,912 A | 11/1993 | Latham | |
| 5,297,109 A | 3/1994 | Barksdale, Jr. et al. | |
| 5,303,208 A | 4/1994 | Dorr | |
| 5,376,933 A | 12/1994 | Tupper et al. | |
| 5,390,152 A | 2/1995 | Boucher et al. | |
| 5,412,618 A | 5/1995 | Gilmour | |
| 5,438,552 A | 8/1995 | Audi et al. | |
| 5,442,358 A | 8/1995 | Keeler et al. | |
| 5,455,806 A * | 10/1995 | Hutson | 367/100 |
| 5,493,619 A | 2/1996 | Haley et al. | |
| 5,515,337 A | 5/1996 | Gilmour et al. | |
| 5,525,081 A | 6/1996 | Mardesich et al. | |
| 5,537,366 A | 7/1996 | Gilmour | |
| 5,546,356 A | 8/1996 | Zehner | |
| 5,561,641 A * | 10/1996 | Nishimori et al. | 367/90 |
| 5,574,700 A | 11/1996 | Chapman | |
| 5,596,549 A | 1/1997 | Sheriff | |
| 5,602,801 A | 2/1997 | Nussbaum et al. | |
| 5,612,928 A | 3/1997 | Haley et al. | |
| 5,675,552 A | 10/1997 | Hicks et al. | |
| 5,694,372 A | 12/1997 | Perennes | |
| 5,805,528 A | 9/1998 | Hamada et al. | |
| 5,850,372 A | 12/1998 | Blue | |
| 5,930,199 A | 7/1999 | Wilk | |
| 5,991,239 A | 11/1999 | Fatemi-Booshehri et al. | |
| 6,002,644 A | 12/1999 | Wilk | |
| 6,084,827 A * | 7/2000 | Johnson et al. | 367/103 |
| 6,215,730 B1 | 4/2001 | Pinto | |
| 6,273,771 B1 | 8/2001 | Buckley et al. | |
| 6,335,905 B1 | 1/2002 | Kabel | |
| 6,421,299 B1 * | 7/2002 | Betts et al. | 367/105 |
| 6,445,646 B1 | 9/2002 | Handa et al. | |
| 6,449,215 B1 * | 9/2002 | Shell | 367/7 |
| 6,537,224 B2 | 3/2003 | Mauchamp et al. | |
| 6,606,958 B1 | 8/2003 | Bouyoucos | |
| 6,678,403 B1 | 1/2004 | Wilk | |
| 6,738,311 B1 | 5/2004 | Guigne | |
| 6,842,401 B2 | 1/2005 | Chiang et al. | |
| 6,941,226 B2 | 9/2005 | Estep | |
| 6,980,688 B2 | 12/2005 | Wilk | |
| 7,236,427 B1 | 6/2007 | Schroeder | |
| 7,355,924 B2 | 4/2008 | Zimmerman et al. | |
| 7,405,999 B2 | 7/2008 | Skjold-Larsen | |
| 7,542,376 B1 * | 6/2009 | Thompson et al. | 367/104 |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 2001/0026499 A1 | 10/2001 | Inouchi | |
| 2002/0071029 A1 * | 6/2002 | Zell et al. | 348/97 |
| 2003/0202426 A1 | 10/2003 | Ishihara et al. | |
| 2004/0184351 A1 * | 9/2004 | Nishimori et al. | 367/103 |
| 2005/0043619 A1 * | 2/2005 | Sumanaweera et al. | 600/437 |
| 2005/0099887 A1 * | 5/2005 | Zimmerman et al. | 367/12 |
| 2005/0216487 A1 * | 9/2005 | Fisher et al. | 707/100 |
| 2006/0002232 A1 | 1/2006 | Shah et al. | |
| 2006/0023570 A1 * | 2/2006 | Betts et al. | 367/88 |
| 2007/0025183 A1 * | 2/2007 | Zimmerman et al. | 367/88 |
| 2007/0091723 A1 * | 4/2007 | Zhu et al. | 367/88 |
| 2011/0013484 A1 | 1/2011 | Coleman et al. | |
| 2011/0013485 A1 | 1/2011 | Maguire | |
| 2012/0106300 A1 | 5/2012 | Maguire | |

FOREIGN PATENT DOCUMENTS

| | | |
|---|---|---|
| JP | 50-109389 (U) | 9/1975 |
| JP | 54-054365 (U) | 4/1979 |
| JP | 57-046173 A | 3/1982 |
| JP | 61-116678 A | 6/1986 |
| JP | 62-099877 (U) | 6/1987 |
| JP | 62-134084 (U) | 8/1987 |
| JP | 62-190480 (A) | 8/1987 |
| JP | 63-261181 (A) | 10/1988 |
| JP | 4-357487 A | 12/1992 |
| JP | 4357487 A | 12/1992 |
| JP | 7-031042 (A) | 1/1995 |
| JP | 10-186030 (A) | 7/1998 |
| JP | 2001-074840 (A) | 3/2001 |
| JP | 2004-020276 (A) | 1/2004 |
| WO | WO 84/01833 A1 | 5/1984 |
| WO | WO 98/15846 | 4/1998 |
| WO | WO 03/009276 A2 | 1/2003 |

OTHER PUBLICATIONS

Gary Melvin, Yanchao Li, Larry Mayer, and Allan Clay "Commercial fishing vessels, automatic acoustic logging systems and 3D data visualization" ICES J. Mar. Sci. (2002) 59(1): 179-189.*

Pratson, Lincoln F., Edwards, Margo H. "Introduction to advances in seafloor mapping using sidescan sonar and multibeam bathymetry data" Marine Geophysical Research, Springer Netherlands. vol. 18, No. 6, p. 601-605, 1996.*

Hansen, Hans Herman., "Circular vs. rectangular transducers", Dept of Electronics and Telecommunications, Norwegian University of Science and Technolgy, 28pp, Mar. 2010.*

Kielczynski, P., Pajewski, W., and Szalewski, M., "Finite Element Method(FEM) and Impulse Response Method (IRM) analysis of circular and rectangular transducers". 1995 IEEE Ultrasonics Symposium, p. 693-696. 1995.*

Anderson, K.; "Side-Scanning for Sport Fishing"; Salt Water Sportsman; Apr. 1, 2009; 4 pages.

Andrew, C., et al.; "Setup and Trouble shooting Procedures for the KIein 5500 Sidescan Sonar"; Australian Government; Department of Defence; Maritime Operations Division; Systems Sciences Laboratory; Published Nov. 2003.

Armstrong, A.A., et al.; "New Technology for Shallow Water Hydrographic Surveys"; Proceedings of the 25th Joint Meeting of UJNR Sea-bottom Surveys Panel; Dec. 1996.

Asplin, R.G., et al.; "A new Generation Side Scan Sonar"; Oceans '88 Proceedings. 'A Partnership of Marine Interests'; vol. 2; Oct.-Nov. 1988; pp. 329-334.

Carey, W.M., "Sonar Array Characterization, Experimental Results"; IEEE Journal of Oceanic Engineering; vol. 23; Issue 3; Jul. 1998; pp. 297-306.

Baker, N., et al, "Rifting History of the Northern Mariana Trough: SeaMARCH II and Seismic Reflection Surveys," Journals of Geophysical Research, vol. 101, No. B5, May 10, 1996.

Cowie, P.A., et al., "Quantitative Fault Studies on the East Pacific Rise: A Comparison of Sonar Imaging Techniques," Journal of Geophysical Research, vol. 99, B8, Aug. 10, 1994.

Curcio, J., et al.; "SCOUT—A Low Cost Autonomous Surface Platform for Research in Cooperative Autonomy"; Department of Mechanical Engineering; Massachusetts Institute of Technology; Aug. 2005.

Farrell, E.J.; , "Color Display and Interactive Interpretation of Three-Dimensional Data"; IBM Journal of Research and Development; vol. 27; No. 4; Jul. 1983; pp. 356-366.

Glynn, Jr., J.M., et al.; "Survey Operations and Results Using a Klein 5410 Bathymetric Sidescan Sonar"; Retrieved from the Internet <URL: http://www.thsoa.org/hy07/03_04.pdf; Mar. 2007.

Hansen, H.H.; "Circular vs. rectangular transducers"; Department of Electronics and Telecommunications; Norwegian University of Science and Technolgy; Mar. 2010; 28 pages.

Hughes Clarke, J. E., et al., Knudsen 320 200 kHz keel-mounted sidescan trials; Results from 2000/2001/2002 field operations; [online]; Retrieved on Jun. 23, 2010 from the Internet <URL: http://www.omg.unb.ca/Ksidescan/K320_SStrials.html; 11 pages.

Hughes Clarke, J.E.; "Seafloor characterization using keel-mounted sidescan: proper compensation for radiometric and geometric distortion"; Canadian Hydrographic Conference; May 2004; 18 pages.

Hussong, D.M., et al., "High-Resolution Acoustic Seafloor Mapping," 20th Annual OTC, Houston, TX, May 2-5, 1988.

Jonsson, J., et al. "Simulation and Evaluation of Small High-Frequency Side-Scan Sonars using COMSOL"; Excerpt from the Proceedings of the COMSOL Conference; 2009; Milan, Italy.

Key, W.H.; "Side Scan Sonar Technology"; Oceans 2000 MTS/IEEE Conference and Exhibition; vol. 2; Sep. 2000; pp. 1029-1033.

Kielczynski, P., et al.; "Finite Element Method (FEM) and Impulse Response Method (IRM) analysis of circular and rectangular transducers"; 1995 IEEE Ultrasonics Symposium; 1995; pp. 693-696.

Kozak, G.; "Side Scan Sonar Target Comparative Techniques for Port Security and MCM Q-Route Requirements"; L-3 Communications; Klein Associates, Inc.; [Online]; Retrieved from the Internet <URL: http://www.chesapeaketech.com/techniques-port-security.pdf; 11 pages.

Krotser, D.J., et al.; "Side-Scan Sonar: Selective Textural Enhancement"; Oceans'76; Washington, DC; Sep. 1976.

Kvitek, R.G., et al.; "Victoria Land Latitudinal Gradient Project: Benthic Marine Habitat Characterization"; California State University; Monterey Bay; Field Report; Feb. 25, 2004.

Langeraar, W.; "Surveying and Charting of the Seas"; Elsevier Oceanography Series; vol. 37; Sep. 1983; p. 321.

Manley, J.E.; "Development of the Autonomous Surface Craft 'Aces'"; Oceans '97 MTS/IEEE Conference Proceedings; Oct. 1997; pp. 827-832.

Manley, J.E., et al.; "Evolution of the Autonomous Surface Craft 'AutoCat'"; Oceans 2000 MTS/IEEE Conference and Exhibition; vol. 1; Sep. 2000; pp. 403-408.

Melvin, G., et al.; Commercial fishing vessels, automatic acoustic logging systems and 3D data visualization; ICES; Journal of Marine Science; vol. 59; Issue 1; 2002; pp. 179-189.

Newman, P.M.; "MOOS-Mission Orientated Operating Suite"; Department of Ocean Engineering; Massachusetts Institute of Technology; 2002.

Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.

Prickett, T.; "Underwater Inspection of Coastal Structures"; The REMR Bulletin; vol. 14; No. 2; Aug. 1997.

Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.

Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.

Shono, K., et al.; "Integrated Hydro-Acoustic Survey Scheme for Mapping of Sea Bottom Ecology"; Ocean Research Institute; Tokyo, Japan; Nov. 2004.

Trevorrow, M.V., et al.; "Description and Evaluation of a Four-Channel, Coherent 100-kHz Sidescan Sonar"; Defence R&D Canada-Atlantic; Dec. 2004.

Vaganay, J., et al.; "Experimental validation of the Moving Long Base-Line Navigation Concept"; 2004 IEEE/OES Autonomous Underwater Vehicles; Jun. 2004.

Vaneck, T.W., et al.; "Automated Bathymetry Using an Autonomous Surface Craft"; Journal of the Institute of Navigation; vol. 43; Issue 4; Winter 1996; pp. 329-334.

Waite, A.D.; "Sonar for Practising Engineers"; Third Edition; John Wiley & Sons, Ltd.; West Sussex, England; © 2002; 323 pages.

Alpine Geophysical Data Programmer Model 485C Brochure and letter dated Feb. 17, 1976; 2 pages.

Benthos C3D Sonar Imaging System; "High Resolution Side Scan Imagery with Bathymetry"; Benthos, Inc.; © May 2002.

Coastal Engineering Technical Note; "Side-Scan Sonar for Inspecting Coastal Structures"; U.S. Army Engineer Waterways Experiment Station; Revised Nov. 1983.

ConCAT Containerised Catamaran; Inshore hydrographic survey vessel that fits in a container; In Cooperation with Uniteam International; Kongsberg Simrad AS; Apr. 2004.

Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.

Detailed Sonar Transducer Product Information; Transducer Products; Side Scans; Models T36, T63, T62, and T403; Dec. 30, 2003; Retrieved from internet: URL:http://www.neptune-sonar.com/products.as_btype=Side-Scan+Transducers&category=; 4 pages.

Kongsberg Brochure EA 400 Survey; "A complete, integrated survey system"; Kongsberg Maritime AS; Oct. 2003.

Kongsberg Brochure EA 400/600 "Sidescan Echo sounder with combined sidescan and depth soundings"; Kongsberg Maritime AS; May 2004.

EDO Corporation Global Technology Reach, Model 6400 Fan Beam Transducer; http:/web/archive/org/web/20040608054923/www.edoceramic.con/NavDucers.htm; Jun. 3, 2004.

EM1110-2-1003; Department of the Army; U.S. Army Corps of Engineers; Engineering and Design; Hydrographic Surveying; Apr. 1, 2004.

File Wrapper of Provisional U.S. Appl. No. 60/552,769, filed Mar. 12, 2004; Applicant: Terrence Schoreder.

Final Report; Early Implementation of Nearshore Ecosystem Database Project Tasks 2 and 3; [online]; Retrieved on Feb. 26, 2010 from the Internet <URL: http://seafloor.csumb.edu/taskforce/html%202%20web/finalreport.htm; 90 pages.

FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.

GeoAcoustics; A Kongsberg Company; GeoSwath Plus Brochure; "Wide swath bathymetry and georeferenced side scan"; [Online]; Retrieved from the internet < URL: http://www.km.kongsberg.com/ks/web/nokbg0397.nsf/AllWeb/F4B7FD3461368388C1257599002D34BC/$file/GeoSwath-Plus-brochure.pdf?OpenElement.

GeoPulse; GeoAcoustics Pinger Sub-Bottom Profiler; Retrieved from the Internet <URL: http://www.km.kongsberg.com/ks/web/nokbg0397.nsf/AllWeb/D1084BB7DD0FD21DC12574C0003E01EA/$file/GeoPulse_Profiler.pdf?OpenElement; GeoAcoustics Limited, UK; A Kongsberg Company.

GlobalMap Sport; Installation and Operation Instructions; Lowrance Electronics, Inc.; © 1996; 61 pages.

GPS Speed Correction; Sidescan Sonar; [online]; Retrieved from the Internet URL: <www.hydrakula.uni-kiel.de/downloads/Sidescan%20Sonar.doc; 10 pages.

Humminbird 1197c Operations Manual; Nov. 6, 2007; 188 pages.

Humminbird 200DX Dual Beam Operations Manual; 43 pages.

Humminbird 500 Series; 550, 560, 570 and 570 DI Operations Manual; © 2010; 84 pages.

Humminbird: America's favorite Fishfinder—the leading innovator of Side Imaging technology; [Online]; [Retrieved on Mar. 16, 2011]; Retrieved from the Internet <URL: http://www.humminbird.com/support/ProductManuals.aspx>; 20 pages.

Humminbird: America's favorite Fishfinder—the leading innovator of Side Imaging technology; [Online]; [Retrieved on Mar. 16, 2011]; Retrieved from the Internet <URL: http://www.humminbird.com/support/ProductManuals.aspx>; 5 pages.

Humminbird Dimension 3 Sonar 600 Operations Manual; 24 pages.

The Humminbird GPS Navigational System. Nothing Else Even Close.; Humminbird Marine Information Systems ®; 1992; 10 pages.

Humminbird GPS NS 10 Operations Manual; 75 pages.

Humminbird High Speed Transducer; 4 pages.

Humminbird LCR 400 ID Operations Manual; 28 pages.

Humminbird Marine Information Systems; Dimension 3 Sonar™; 1992; 16 pages.

Humminbird "Matrix 35 Fishing System," Prior to Aug. 2, 2003.

Humminbird Matrix 35 Fishing System; 2 pages.

Humminbird Matrix 55 and 65 Operations Manual; ©2003; 40 pages.

Humminbird Matrix 67 GPS Trackplotter Operations Manual; ©2003; 88 pages.

Humminbird "Matrix 97 GPS Trackplotter Operations Manual" 2003.

Humminbird Matrix 97 Operations Manual; ©2003; 87 pages.

Humminbird Matrix™ 87c Operations Manual; © 2004; 45 pages.

Humminbird The New Wave of Wide; 1997; Humminbird Wide®; fish wide open!®; 24 pages.

Humminbird NS25 Operations Manual; 71 pages.

Humminbird Piranha 1 & 2 Operation Guide; 5 pages.

Humminbird Platinum ID 120 Operations Manual; 36 pages.

Humminbird Platinum ID 600 Operations Manual; 18 pages.

Humminbird "The Product Line>Matrix Products>Matrix 35" http://web.archive.org/web/20030404000447/www.humminbird.com/hb_Products.asp?ID, Apr. 4, 2003.

Humminbird® Trolling Motor Mounted Transducer with Mount Assembly Brochure; © 2008 Humminbird®, Eufaula, AL; 2 pages.

Humminbird Wide 3D Paramount Operations Manual; 44 pages.

Humminbird Wide 3D View Operations Manual; 38 pages.

Humminbird Wide 3D Vision Operations Manual; 38 pages.

Humminbird Wide 3D Vista Operations Manual; 38 pages.

Humminbird Wide Eye Operations Manual; 32 pages.

Humminbird Wide Paramount Operations Manual; fish wide open!; 32 pages.

Humminbird "Wideside"; Schematic; Dec. 15, 1994; 5 pages.

Hydro Products; A Tetra Tech Company; 4000 Series Giffft Precision Depth Recorder Product Brochure; date stamped 1977.

The Hydrographic Society—Corporate Member News—Kongsberg Simrad; Jul. 3, 2008; 7 pages.

Imagenex Model 855 Brochure: Online; Documents retrieved from internet web archives as follows: URL:http://web.archive.org/web/20021023212210/http:/www.imagenex.com/Products/855_858/855_858.html; 1 page; Archived on Oct. 23, 2002 URL:http://web.archive.org/web/20021024124035/http:/www.imagenex.com/Products/855_858/855/855.html; 1 page; Archived on Oct. 24, 2002 URL:http://web.archive.org/web/20021024125254/http:/www.imagenex.com/Products/855_858/858/858.html; 1 page; Archived on Oct. 24, 2002 URL:http://web.archive.org/web/20030424071306/http:/www.imagenex.com//855_Page_1.jpg; 1 page; Archived on Apr. 24, 2003 URL:http://web.archive.org/web/20030424091547/http:/www.imagenex.com/855_Page_2.jpg; 1 page; Archived on Apr. 24, 2003 URL:http://web.archive.org/web/20030424094158/http:/www.imagenex.com/855_Page_3.jpg; 1 page; Archived on Apr. 24, 2003 URL:http://web.archive.org/web/20030424101301/http:/www.imagenex.com/855_Page_4.jpg; 1 page; Archived on Apr. 24, 2003 URL:http://web.archive.org/web/20030424101939/http:/www.imagenex.com/855_Page_5.jpg; 1 page; Archived on Apr. 24, 2003 URL:http://web.archive.org/web/20030424135458/http:/www.imagenex.com//855_Page_6.jpg; 1 page; Archived on Apr. 24, 2003 URL:http://web.archive.org/web/20030424141232/http:/www.imagenex.com//855_Page_7.jpg; 1 page; Archived on Apr. 24, 2003 URL:http://web.archive.org/web/20030424143158/http:/www.imagenex.com/855_Page_8.jpg; 1 page; Archived on Apr. 24, 2003.

Imagenex Model 872 "Yellowfin" Sidescan Sonar; Imagenex Technology Corp.; © 2004-2009.

The Imagenex SportScan; Digital Sidescan Sonar; "Redefining Image Clarity"; Imagenex Technology Corp.; © 2002.

Imagenex SportScan Digital SideScan Sonar Brochure: Online; Documents retrieved from internet web archives as follows: URL:http://web.archive.org/web/20030212030409/http://www.imagenex.com/Products/products.html; 1 page; Archived on Feb. 12, 2003 URL:http://web.archive.org/web/20030214044915/http://www.imagenex.com/Products/SportScan/sportscan.html; 1 page; Archived on Feb. 14, 2003 URL:http://web.archive.org/web/20030222152337/http://www.imagenex.com/Products/SportScan/SportScan_Specs/sportscan_specs.html; 3 pages; Archived on Feb. 22, 2003 URL:http://web.archive.org/web/20030222161450/http://www.imagenex.com/Products/SportScan/FAQ_s/faq_s.html; 4 pages; Archived on Feb. 22, 2003 URL:http://web.archive.org/web/20030419024526/http://www.imagenex.com/Products/SportScan/distributors.html; 2 page; Archived on Apr. 19, 2003.

Imagenex (Various) Technical Specifications and User's Manual; Prior to Aug. 2003.

Innomar—Products; "System Variants: SES Side Scan Option"; Retrieved from internet URL:http://www.innomar.com/produ_2000sidescan.htm; Dec. 30, 2003; 2 pages.

International Search Report and Written Opinion for Application No. PCT/US2010/039441 dated Oct. 11, 2010.

International Search Report and Written Opinion for Application No. PCT/US2010/039443 dated Oct. 6, 2010.

"ITC Application Equations for Underwater Sound Transducers"; Published by International Transducer Corporation, 1995, Rev. Aug. 2000; 3 pages.

Kelvin Hughes Transit Sonar; ". . . a new dimension in shallow water survey to assist in . . ."; Hydrography; Dredging; Salvage; Underwater Construction and Similar Works; Mar. 1966; 8 pages.

Klein Digital Sonar Systems, ". . . The Next Generation From the World Leader in Side Scan Sonar and Sub-bottom Profiling Systems," 1988.

Lowrance HS-3DWN Transducer Assembly and Housing (Eagle IIID); Aug. 1994.

Lowrance LCX-18C & LCX-19C Fish-finding Sonar & Mapping GPS; Operation Instructions; © 2002; 200 pages.

Lowrance Transducers Product Information; 1 page.

Navico Design Report of Raytheon Electronics Side Looker Transducer; Mar. 12, 2010; 18 pages.

NOAA: Nautical Charting general information from public records; [Online]; Retrieved on Sep. 10, 2010 from the Internet < URL: http://www.nauticalcharts.noaa.gov/csdl/learn_hydroequip.html; 2 pages; http://www.nauticalcharts.noaa.gov/csdl/learn_hydroequip.html; 1 page; http://www.nauticalcharts.noaa.gov/csdl/PDBS.html; 2 pages; http://www.nauticalcharts.noaa.gov/hsd/pub.html; 1 page; http://www.nauticalcharts.noaa.gov/hsd/fpm/fpm.htm; 1 page; http://www.ozcoasts.gov.au/geom_geol/toolkit/Tech_CA_sss.jsp; 12 pages.

ONR Grant N66604-05-1-2983; Final Report; "Cooperative Autonomous Mobile Robots"; Retrieved from the Internet <URL: http://dodreports.com/pdf/ada463215.pdf; Post 2006.

Odom Echoscan™: For Sea Floor or Riverbed Surveys; Odom Hydrographic Systems; Apr. 26, 2002.

Odom Hydrographic Systems ECHOSCAN Manual; Revision 1.11; Apr. 26, 2002.

"Product Survey Side-Scan Sonar"; Hydro International Magazine; vol. 36; Apr. 2004; pp. 36-39.

R/V Quicksilver; Hydrographic Survey Launch Bareboat or Crewed; F/V Norwind, Inc.

R/V Tangaroa; Fact Sheet; Explore lost worlds of the deep; Norfanz Voyage; May 10 to Jun. 8, 2003.

SeaBat 8101 Product Specification; 240kHz Multibeam Echo Sounder; © 1999 RESON Inc.; Version 4.0.

Simrad EA 500; Hydrographic Echo Sounder; Product Specifications; Revision: Sep. 1993.

SonarBeam Underwater Surveying System Using T-150P tow-fish hull mounted; [Online]; [Retrieved on Feb. 12, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902034.html; 4 pages; [Retrieved on Feb. 16, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902230.html; 7 pages.

Starfish 450H; Sidescan System; Tritech International Limited; UK. T297-00-01-01 Transducer housing outline drawing; Neptune Sonar Ltd.; © 2002.

Techsonic Industries, Inc.; "Mask, Acoustic"; Schematic, May 24, 1996.

Techsonic Industries, Inc.; "Element, 455 kHz"; Schematic, Jun. 13, 1996.

"Transducers Quad Beam," Prior to Aug. 2, 2003.

U-Tech Company Newsletter.

USACE, "Chapter 11, Acoustic Multibeam Survey Systems for Deep-Draft Navigation Projects," Apr. 1, 2004

Ultra III 3D Installation and Operation Instructions; EAGLE™; © 1994.

Westinghouse Publication; "Side-Scan Sonar Swiftly Surveys Subsurface Shellfish"; May 1970; 4 pages.

Sonar Theory and Applications; Excerpt from Imagenex Model 855 Color Imaging Sonar User's Manual; Imagenex Technology Corp.; Canada; 8 pages.

Ballantyne, J.; "Find and Catch More, Fish, Quickly and Easily, with the Fishin' Buddy 2255"; [Online]; [Retrieved on Dec. 7, 2011]; Retrieved from the Internet <URL:http://www.articleslash.net/Recreation-and-Sports/Fishing/67018_Find-and-Catch-More-Fish-Quickly-and-Easily-with-the-FISHIN-BUDDY-2255.html>; 4 pages.

Deep Vision Side Scan Sonar Systems; [Online]; [Retrieved on Dec. 2, 2011]; Retrieved from the Internet <URL:http://www.deepvision.se/products.htm>; 5 pages.

Fishin' Buddy 4200™ Operations Manual; Dated Dec. 21, 2005; 16 pages.

Fishing Tool Reviews—Bottom Line Fishin Buddy 1200 Fishfinder; [Online]; [Retrieved on Dec. 7, 2011]; Retrieved from the Internet <URL:http://www.tackletour.com/reviewbottomline1200.html>; 4 pages.

Humminbird 100 Series™ Fishin' Buddy®; 110, 120, 130 and 140c Product Manual; © 2007; 2 pages.

Sidefinder—Reviews & Brand Information—Techsonic Industries, Inc.; [Online]; [Retrieved on Dec. 7, 2011]; Retrieved from the Internet <URL: http://www.trademarkia.com/sidefinder-74113182.html>; 4 pages.

Trademark Electronic Search System (TESS); Word Mark: Sidefinder; [Online]; [Retrieved on Dec. 7, 2011]; Retrieved from the Internet <URL: http://tess2.uspto.gov/bin/showfield?f=doc&state=4009:qi4jkj.2.1>; 2 pages.

Marine Acoustics Society of Japan (Editor); "Basics and Application of Marine Acoustics"; Apr. 28, 2004; pp. 152-172.

International Search Report on Patentability for Application No. PCT/US05/27436 dated Nov. 20, 2007; 1 page.

International Preliminary Report on Patentability for Application No. PCT/US05/27436 dated Dec. 6, 2007; 5 pages.

Translation of Notice of Reason(s) for Rejection for Japanese Application No. 2007-524919 dated Aug. 16, 2011; 4 pages.

Communication [extended European Seach Report] for European Application No. 05782717.2-2220 dated Aug. 31, 2011; 12 pages.

Communication for European Patent Application No. 05782717.2-2220 dated May 11, 2012; 9 pages.

Australian Government, Department of Sustainability, Environment, Water, Population and Communities; Fact Sheet—The RV Tangaroa; date unknown; 3 pages.

Blondel, Philippe; The Handbook of Sidescan Sonar; © 2009; 316 pages.

Calcutt, Ron; Lowrance Book of Sonar & GPS; © 1986; and Lowrance Book of Sonar & GPS Update; 1997; collectively 122 pages.

Derrow, II, Robert W. et al., A Narrow-Beam, Side-Looking Sonar for Observing and Counting Fish in Shallow Aquaculture Ponds; 1996; 34 pages.

DSME E&R Ltd.; Remotely Operated Sonar Boat System (SB-100S); http://dsmeu.en.ec21.com/Remotely_Operated_Sonar_Boat_System-618904_2479905.html; printed on Feb. 12, 2010; 3 pages.

Eagle Electronics; Ultra 3D Installation and Operation Manual; © 2002; 24 pages.

Furuno Electric Co., Ltd.; Side Looking Sonar, Model SL-16, 1983; 4 pages.

Geoacoustics; GeoPulse, Profiler System; Feb. 2006, 2 pages.

Humminbird 1198C Review for Catfishing, Catfishing "How To" Catfishing Techniques, Oct. 31, 2011, 9 pages.

Imagenex Technology Corp., Model 881 SportScan, Single or Dual Frequency Digital Sidescan Sonar, Software User's Manual; May 9, 2003; 16 pages.

Klein Associates, Inc.; Modular Side Scan Sonar and Sub-Bottom Profiler System Components for Customized Configurations; date unknown; 10 pages.

Klein, Martin; Side Scan Sonar; UnderSea Technology; Apr. 1967; 4 pages.

Klein, M. et al., Sonar—a modern technique for ocean exploitation; IEEE Spectrum; Jun. 1968; pp. 40-46 and Authors page.

Klein, Martin; New Developments in Side Scan Sonar for Hydrography; date unknown; 14 pages.

Klein, Martin; Side Scan Sonar; Offshore Services; Apr. 1977, pp. 67, 68, 71, 72, 75.

Klein, Martin; New Capabilities of Side Scan Sonar Systems; date unknown; pp. 142-147.

Klein, Martin; Sea Floor Investigations Using Hybrid Analog/Digital Side Scan Sonar; date unknown; 18 pages.

Kongsberg Maritime AS; Side Looking Transducer, 200 kHz—0.5x49, 200 kHz side looking transducer for shallow water and surveying and high resolution; date unknown; 2 pages.

Kongsberg Simrad AS; ConCat Containerised Catamaran, Inshore hydrographic survey vessel that fits in a container, Rev. B, Apr. 2004; 4 pages.

Kvitek, Rikk et al.; Final Report, Early Implementation of Nearshore Ecosystem Database Project Tasks 2 and 3; http://seafloor.csumb.edu/taskforce/html%202%20web/finalreport.htm; Jul. 29, 1999; 92 pages.

Law, G., Sideways Glance, Side- and down-scan Imaging Open New Windows in Fishing Finding, Electronics, Nov. 2011, pp. 28-29.

Leonard, John L.; Cooperative Autonomous Mobile Robots; date unknown; 11 pages.

Maritime surveys takes delivery of SeaBat 8160; Sea Technology, Jul. 2001; http://findarticles.com/p/articles/mi_qa5367/is_200107/ai_n21475675/; webside printed Jun. 30, 2010.

Marine Sonic Technology, Ltd.; Sea Scan® PC Side Scan Sonar System Information/Specifications Sheet; Sep. 9, 2002; 10 pages.

Mesotech; Mesotech Model 971 Sonar System Summary; Mar. 26, 1985, 2 pages.

Oughterson, B., Sophisticated Sonar Reveals Detailed Images Recently Unimaginable. Is it Too Much too Soon?, Basic Instincts, pp. 75-78.

Raymarine, L750 Fishfinder, Operation Handbook; date unknown; 93 pages.

Raytheon Marine Company; Installation Instructions; Oct. 1998; 2 pages.

Remtechsroy Group; Side Scan Sonar-Remotely Operated Vehicle Surface; http://remtechnology.en.ec21.com/Side_Scan_Sonar_Remotely_Operated-2902034_2902230.html; printed on Feb. 12, 2010; 4 pages.

Reson Inc.; SeaBat 8101 Product Specification, 240kHz Multibeam Echo Sounder; © 1999; 2 pages.

Reson; SeaBat 8101; Multibeam acoustic echosounder; date unknown; 1 page.

Reson; SeaBat 8160 Product Specification, Multibeam Echosounder System; date unknown; 2 pages.

Russell-Cargill, W.G.A. ed.; Recent Developments in Side Scan Sonar Techniques; © 1982; 141 pages.

Simrad; Product Specifications, Simrad EA 500 Side-looking Option; Feb. 1992, 1 page.

Techsonic Industries, Inc., Humminbird Wide fish wide open!; brochure, 1997; 4 pages.

Techsonic Industries, Inc.; Humminbird GPS brochure; © 1992; 10 pages.

Teleflex Electronic Systems; Humminbird 1997; © 1996; 24 pages.

The Norwegian and Finnish navies performing operations with the Kongsberg Hugin AUV and minesniper mine disposal vehicle in Finnish waters; FFU nytt; No. 3, Nov. 2003; p. 12.

Trabant, Peter K.; Applied High-Resolution Geophysical Methods, Offshore Geoengineering Hazards; © 1984; 265 pages.

Tritech International Limited; StarFish; 450H Hull-Mounted Sidescan System; date unknown; 2 pages.

Universal Sonar Limited; High Frequency Broad Band Line Array Type G27/300LQ; date unknown 2 pages.

Williams, J. P., *Glancing Sideways, Nautical Know-How*, Chesapeake Bay Magazine, May 2011, pp. 14-17.

* cited by examiner

FIG. 12A.
FIG. 12B.
FIG. 12C.
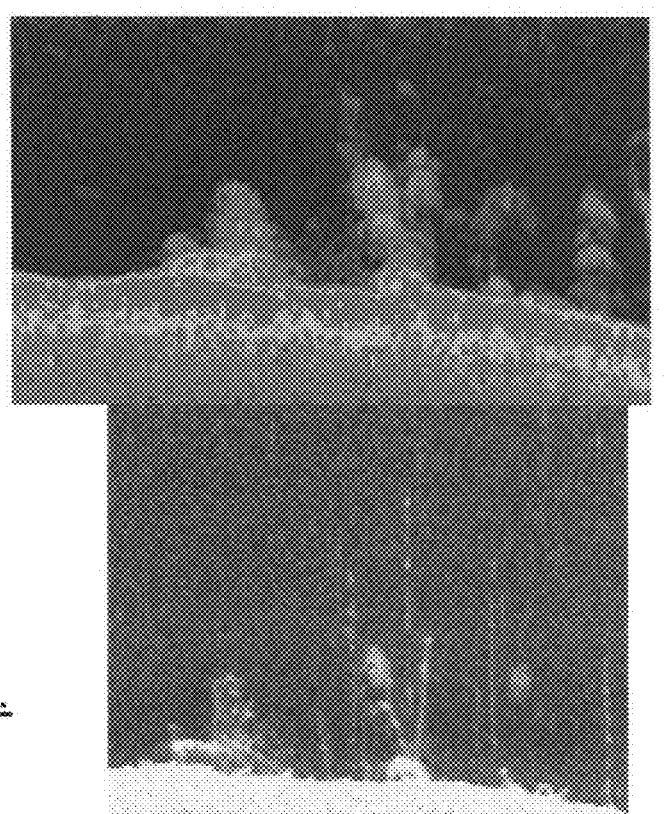

LINEAR AND CIRCULAR DOWNSCAN IMAGING SONAR

FIELD OF THE INVENTION

Embodiments of the present invention relate generally to sonar systems, and more particularly, to providing an ability to display images from both linear and circular downscan transducers.

BACKGROUND OF THE INVENTION

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Devices such as transducer elements, or simply transducers, have been developed to produce sound or vibrations at a particular frequency that is transmitted into and through the water and also to detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer (e.g., a cylindrical shaped crystal with a circular face) typically creates a conical shaped beam with the apex of the cone being located at the source. Any reflected sound then returns to the transducer to form a return signal that may be interpreted as a surface of an object. Such transducers have often been directed in various directions from surfaced or submerged vessels in order to attempt to locate other vessels and/or the seabed for the purposes of navigation and/or target location.

Since the development of sonar, display technology has also been improved in order to enable better interpretation of sonar data. Strip chart recorders and other mechanical output devices have been replaced by, for example, digital displays such as LCDs (liquid crystal displays). Current display technologies continue to be improved in order to provide, for example, high quality sonar data on multi-color, high resolution displays having a more intuitive output than early sonar systems were capable of producing.

With display capabilities advancing to the point at which richly detailed information is able to be displayed, attention has turned back to the transducer in order to provide higher quality data for display. Furthermore, additional uses have been developed for sonar systems as transducer and display capabilities have evolved. For example, sonar systems have been developed to assist fishermen in identifying fish and/or the features that tend to attract fish. Historically, these types of sonar systems primarily analyzed the column of water beneath a watercraft with a cylindrical piezo element that produces a conical beam, known as a conical beam transducer or simply as a circular transducer referring to the shape of the face of the cylindrical element. However, with the advent of sidescan sonar technology, fishermen were given the capability to view not only the column of water beneath their vessel, but also view water to either side of their vessel.

Sidescan sonar can be provided in different ways and with different levels of resolution. As its name implies, sidescan sonar is directed to look to the side of a vessel and not below the vessel. In fact, many sidescan sonar systems (e.g., swath and bathymetry sonar systems) have drawn public attention for their performance in the location of famous shipwrecks and for providing very detailed images of the ocean floor, but such systems are costly and complex. Sidescan sonar typically generates a somewhat planar fan-shaped beam pattern that is relatively narrow in beamwidth in a direction parallel to the keel of a vessel deploying the sidescan sonar and is relatively wide in beamwidth in a direction perpendicular to the keel of the vessel. It may be provided in some cases using multibeam sonar systems. Such multibeam sonar systems are typically comprised of a plurality of relatively narrowly focused conventional circular transducer elements that are arrayed next to each other to produce an array of narrowly focused adjacent conical beams that together provide a continuous fan shaped beam pattern. FIG. 1 shows an example of a series of conventional (generally circular) transducer elements 10 arrayed in an arc to produce a multibeam sonar system. FIG. 2 shows a typical fan shaped beam pattern 12 produced by the multibeam sonar system of FIG. 1 as the beam pattern is projected onto the seabed.

However, multibeam sonar systems typically require very complex systems to support the plurality of transducers that are employed in order to form the multibeam sonar system. For example, a typical system diagram is shown in FIG. 3, which includes a display 20 driven by a sonar signal processor 22. The sonar signal processor 22 processes signals received from each of a plurality of transducers 26 that are fed to the sonar signal processor 22 by respective different transceivers 24 that are paired with each of the transducers 26. Thus, conventional multibeam sonar systems tend to include a large number of transceivers and correspondingly introduce complexity in relation to processing the data such systems produce.

More recently, ceramic sidescan transducer elements have been developed that enable the production of a fan shaped sonar beam directed to one side of a vessel. Accordingly, the sea floor on both sides of the vessel can be covered with two elements facing on opposite sides of the vessel. These types of sidescan transducer elements are linear, rather than cylindrical, and provide a somewhat planar fan-shaped beam pattern using a single transducer to provide sidescan sonar images without utilizing the multibeam array described above. However, employment of these types of sidescan elements typically leaves the column of water beneath the vessel either un-monitored, or monitored using conical beam or circular transducers. In this regard, FIG. 4 illustrates an example of a conventional sidescan sonar with linear sidescan transducer elements oriented to produce fan-shaped beams 27 directed from opposite sides of the vessel and a conical beam 28 projecting directly below the vessel. These beams have conventionally been provided to have a conical shape by using conventional cylindrical transducers to produce depth information since sidescan transducers are typically not as useful for providing depth or water column feature information, such as fish targets. However, cylindrical transducers provide poor quality images for sonar data relating to the bottom structure directly below the vessel.

Accordingly, it may be desirable to develop a sonar system that is capable of providing an improved downscan imaging sonar.

BRIEF SUMMARY OF THE INVENTION

Accordingly, embodiments of the present invention employ a linear transducer, directed downward to receive high quality images relative to the water column and bottom features directly beneath the linear transducer and the vessel on which the linear transducer is employed and also employ a circular transducer to provide greater sensitivity with respect to detecting small objects in the water column. Embodiments of the present invention may then provide for a combination of the data from the linear transducer and the circular transducer to be displayed. As such, the advantages of each type of transducer may be combined to produce an improved downscan sonar display.

In one exemplary embodiment, a method for providing a combined linear and circular downscan sonar display is provided. The method may include receiving linear downscan sonar data from a linear downscan transducer, receiving conical downscan sonar data from a circular downscan transducer, and combining the linear downscan sonar data and the conical downscan sonar data to produce combined downscan sonar data.

In another exemplary embodiment, a computer program product for providing a combined linear and circular downscan sonar display is provided. The computer program product may include at least one computer-readable storage medium having computer-executable program code portions stored therein. The computer-executable program code portions may include program code instructions for receiving linear downscan sonar data from a linear downscan transducer, receiving conical downscan sonar data from a circular downscan transducer, and combining the linear downscan sonar data and the conical downscan sonar data to produce combined downscan sonar data.

In another exemplary embodiment, an apparatus for providing a combined linear and circular downscan sonar display is provided. The apparatus may include a sonar signal processor configured for receiving linear downscan sonar data from a linear downscan transducer, receiving conical downscan sonar data from a circular downscan transducer, and combining the linear downscan sonar data and the conical downscan sonar data to produce combined downscan sonar data.

BRIEF DESCRIPTION OF THE SEVERAL VIEWS OF THE DRAWING(S)

The patent or application file contains at least one drawing executed in color. Copies of this patent or patent application publication with color drawing(s) will be provided by the U.S. Patent and Trademark Office upon request and payment of the necessary fee.

Having thus described the invention in general terms, reference will now be made to the accompanying drawings, which are not necessarily drawn to scale, and wherein:

FIG. 12A is an example image of conical downscan sonar data alone according to an exemplary embodiment of the present invention;

FIG. 12B illustrates linear downscan sonar data displayed alone in an example image according to an exemplary embodiment of the present invention;

FIG. 12C illustrates combined linear and conical downscan sonar data displayed in a single display window according to an exemplary embodiment of the present invention;

DETAILED DESCRIPTION OF THE INVENTION

Figure 1:
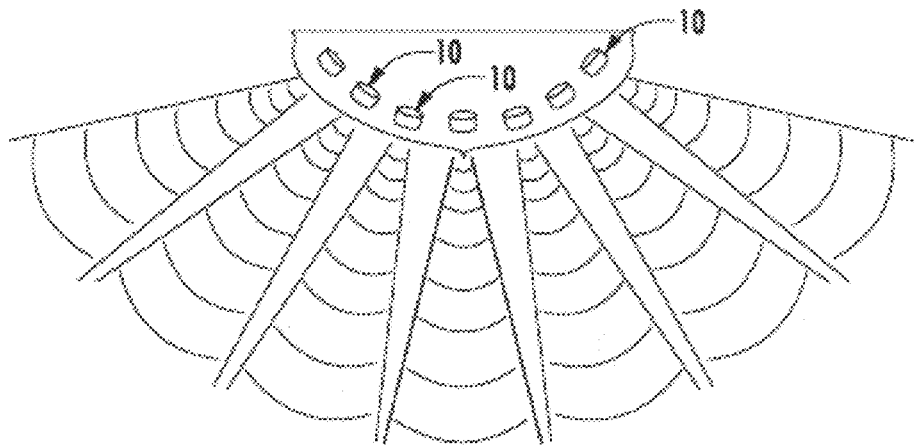
FIG. 1 is a diagram illustrating an example of a series of conventional transducer elements 10 arrayed to produce a multibeam sonar system.
Figure 2:
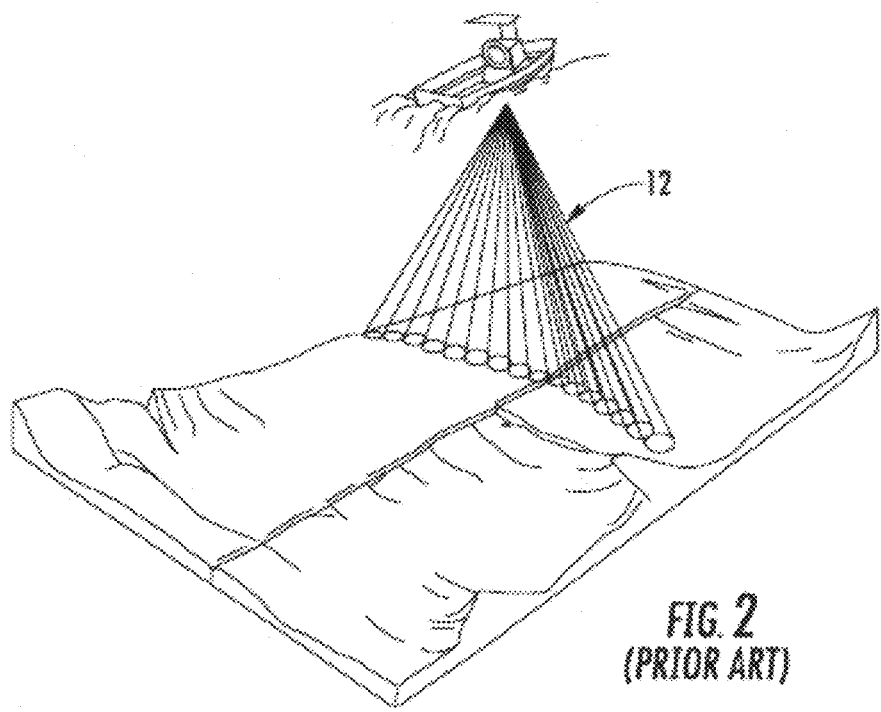
FIG. 2 illustrates a fan shaped beam pattern produced by the conventional multibeam sonar system of FIG. 1 as the beam pattern is projected onto the seabed.
Figure 3:
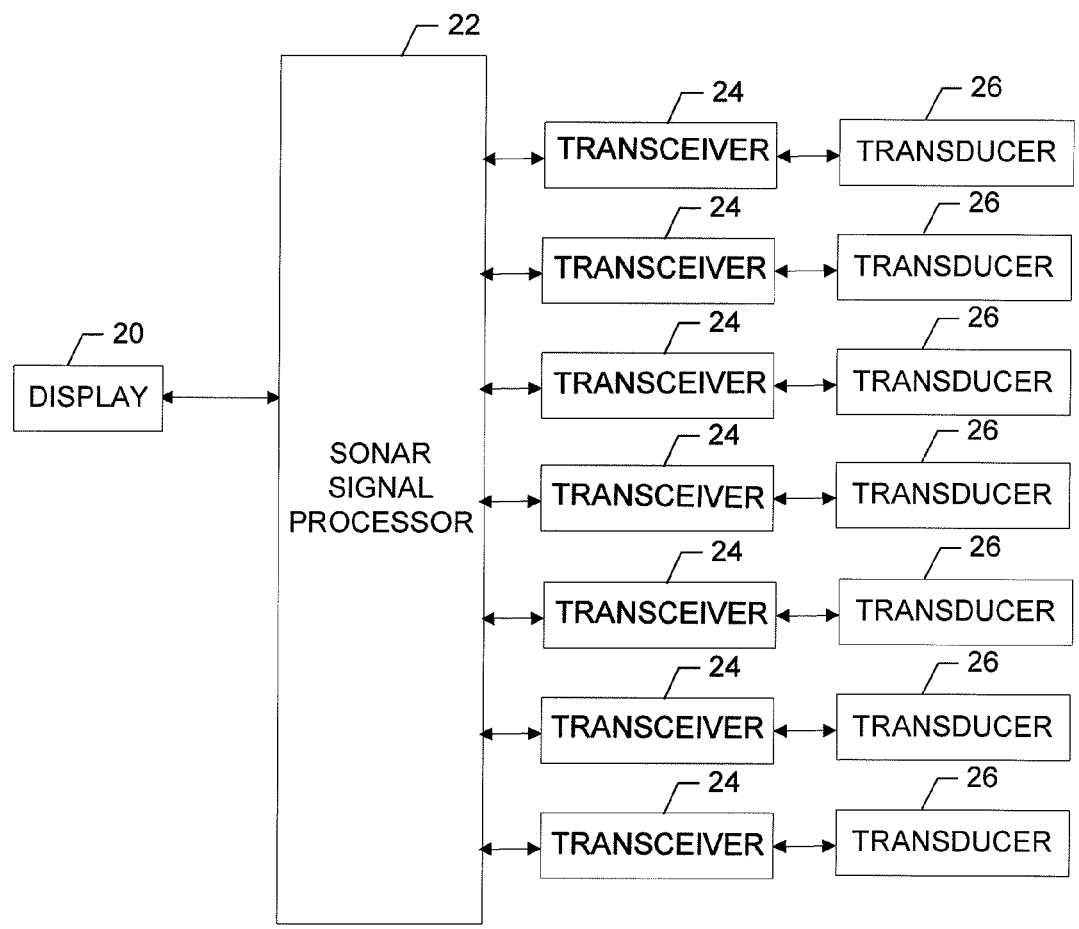
FIG. 3 is a block diagram of a conventional multibeam sonar system for the system shown in FIG. 1.
Figure 4:
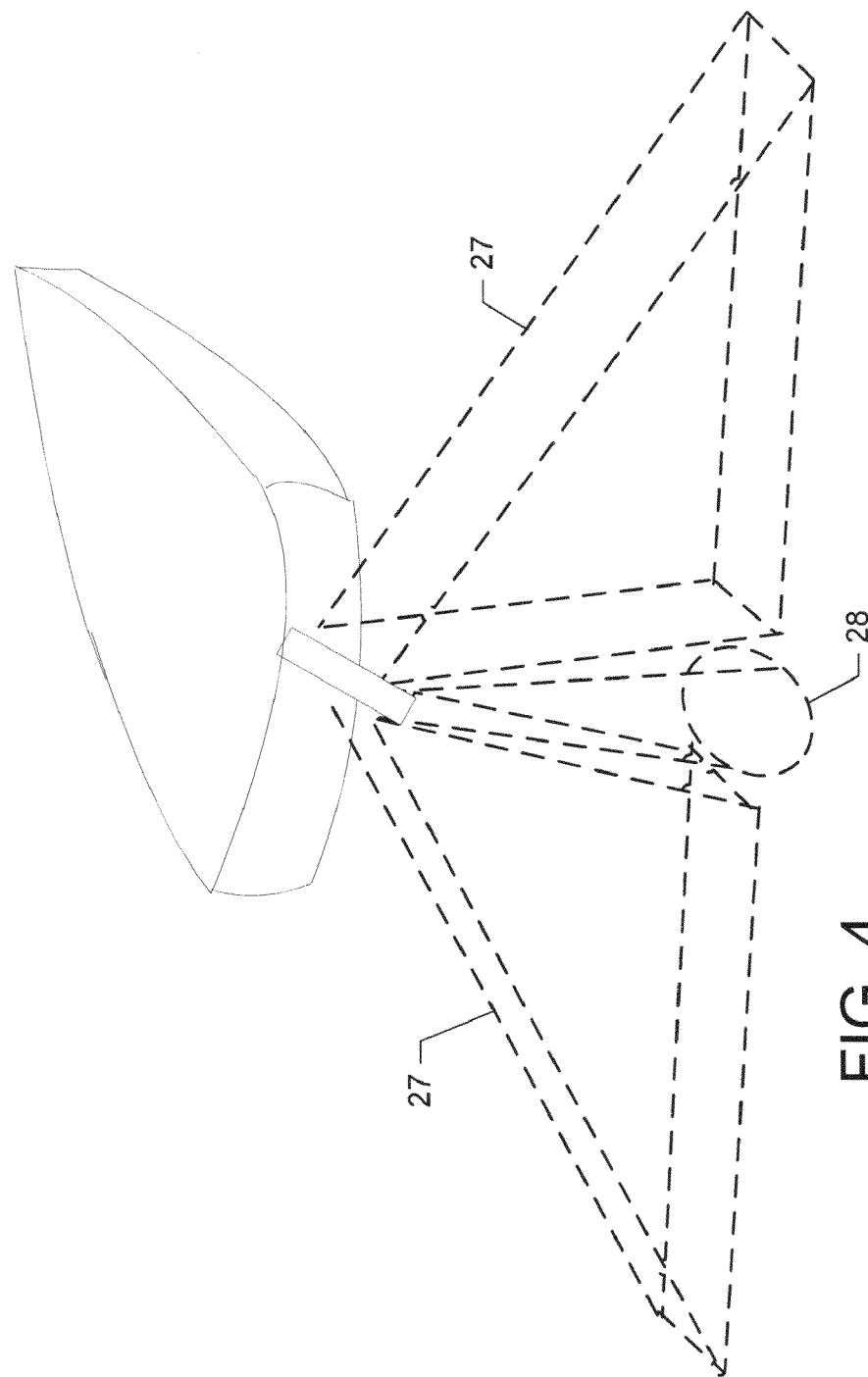
FIG. 4 is a diagram illustrating a conventional sidescan sonar system.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Conventionally, sonar transducers generally don't have overlapping coverage areas in order to minimize interference. Furthermore, since different types of transducers typically may operate with different frequencies and produce different data with corresponding different images, it has been considered impractical or undesirable to combine the output of different types of transducers into a single display. However, embodiments of the present invention overcome some of the technical challenges associated with combining data from different types of transducers and provide flexibility in providing a useful output of combined data to the user.

Figure 5:
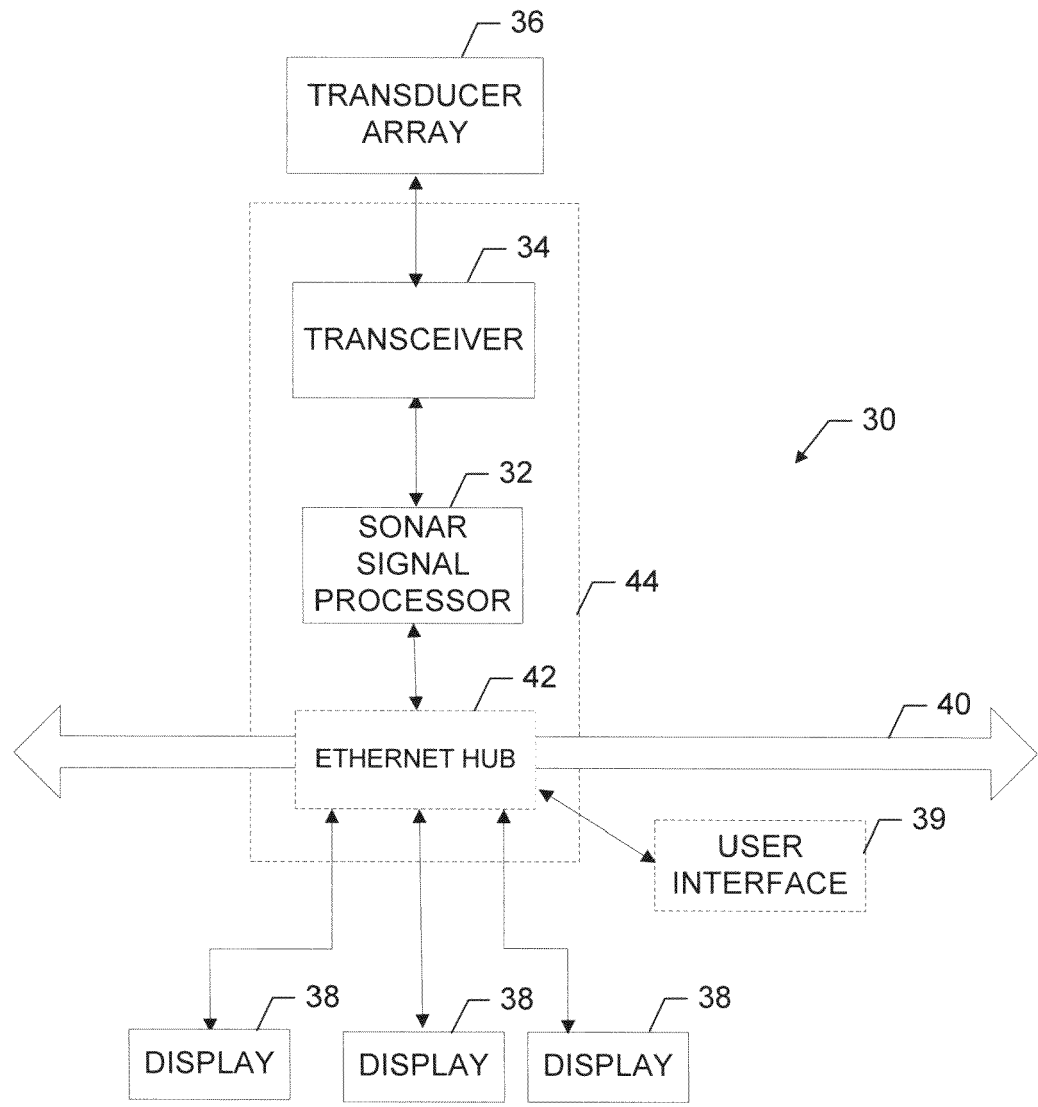
FIG. 5 is a basic block diagram illustrating a sonar system according to an exemplary embodiment of the present invention.

FIG. 5 is a basic block diagram illustrating a sonar system 30 for use with multiple exemplary embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer array 36 and/or numerous other peripheral devices such as one or more displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. However, in some embodiments, components may communicate directly with one another, or be in a common housing, and thus, no network may be provided.

The display 38 may be configured to display images and may include or otherwise be in communication with a user interface 39 configured to receive an input from a user. The display 38 may be, for example, a conventional LCD (liquid crystal display), a touch screen display or any other suitable display known in the art upon which images may be rendered. Although each display 38 of FIG. 5 is shown as being connected to the sonar signal processor 32 via the network and/or via an Ethernet hub, the display 38 could alternatively be in direct communication with the sonar signal processor 32 in some embodiments. Each display 38 may be configured to receive input data from the sonar signal processor 32 (or from an image processor or driving circuitry in communication with or forming a portion of the signal processor 32) and render (e.g., represent, display, present, or depict) the input data in one or more display windows on the display 38. Thus, for example, one or more of the displays 38 may be configured to render different windows that may each display a different type of data or view and, in some cases, more than one of the different windows may be displayed at a time. In this regard, for example, one window may display sonar data from a particular type of transducer while another display window shows sonar data from another type of transducer. In other cases, one window may display sonar data, while another window displays other data such as positioning data or radar data. Furthermore, in an exemplary embodiment of the present invention, one display window may actually display combined sonar data from two different types of transducers.

The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

The transducer array 36 according to an exemplary embodiment may be provided in one or more housings that may provide for flexible mounting with respect to a hull of the vessel on which the sonar system 30 is employed. In this regard, for example, the housing(s) may be mounted onto the hull of the vessel or onto a device or component that may be attached to the hull (e.g., a trolling motor or other steerable device, or another component that is mountable relative to the hull of the vessel). The transducer array 36 may include one or more transducer elements positioned within the housing, as described in greater detail below, and each of the transducer elements may be configured to be directed to cover a respective area of the water column and/or bottom structure in the vicinity of the vessel. In an exemplary embodiment, the transducer elements of the transducer array 36 may include at least one linear transducer and at least one circular transducer. Moreover, in an exemplary embodiment, the transducer array may be oriented downward in order to monitor water and bottom features below the vessel. The transducer array 36 may be configured to both transmit and receive sound pressure waves. However, in some cases, the transducer array 36 could include separate elements for transmission and reception. The transducer array 36 is described in greater detail below, but further variations of the transducer array and other aspects related to the sonar module are described in U.S. patent application Ser. No. 12/460,139, entitled "Downscan Imaging Sonar" filed on even date herewith, the disclosure of which is incorporated herein by reference in its entirety.

In an exemplary embodiment, the sonar signal processor 32, the transceiver 34 and an Ethernet hub 42 or other network hub may form a sonar module 44. As such, for example, in some cases, the transducer array 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device drivers accessible to the Ethernet hub 42 to enable the Ethernet hub 42 to properly work with displays for which the sonar module 44 is compatible. The sonar module 44 may also be enabled to be upgraded with additional device drivers to enable expansion of the numbers and types of devices with which the sonar module 44 may be compatible. In some cases, the user may select a display type to check whether a the display type is supported and, if the display type is not supported, contact a network entity to request software and/or drivers for enabling support of the corresponding display type. In still other cases, particularly in situations in which there is no Ethernet hub 42 and/or network 40, the sonar module 44 may include a single display 38.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, for example, the sonar signal processor 32 may be configured to analyze electrical signals communicated thereto by the transceiver 34 to provide sonar data indicative of the size, location, shape, etc. of objects detected by the sonar system 30. In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer array 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include circuitry for providing transmission electrical signals to the transducer array 36 for conversion to sound pressure signals based on the provided electrical signals to be transmitted as a sonar pulse. The transceiver 34 may also include circuitry for receiving electrical signals produced by the transducer array 36 responsive to sound pressure signals received at the transducer array 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns.

Figure 6A:
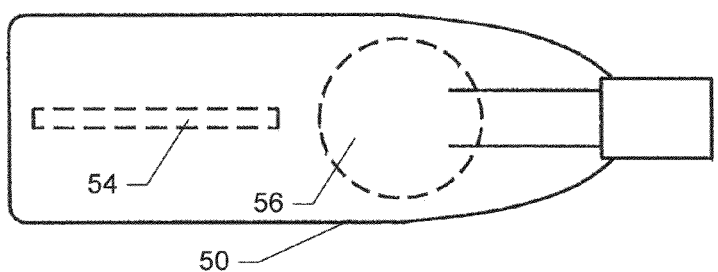
FIG. 6A is a diagram showing a perspective view of a linear downscan transducer and a circular downscan transducer within a single housing from a point above the housing according to an exemplary embodiment of the present invention.
Figure 6B:
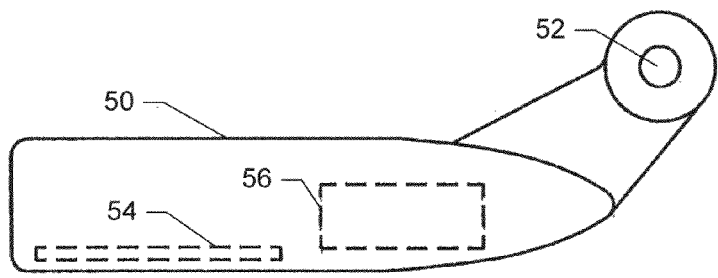
FIG. 6B is a perspective view from one side of the housing of FIG. 6A at a point substantially perpendicular to a longitudinal axis of the housing according to an exemplary embodiment of the present invention.
Figure 6C:
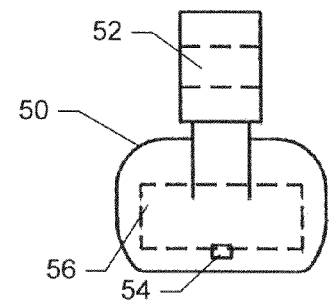
FIG. 6C is a perspective view from the front side of the housing of FIG. 6A at a point looking straight down the longitudinal axis of the housing according to an exemplary embodiment of the present invention.

FIG. 6 (which includes FIGS. 6A, 6B and 6C) is a diagram illustrating a more detailed view of at least a portion of the transducer array 36 according to an exemplary embodiment. As shown in FIG. 6, the transducer array 36 may include a housing 50 that may include one or more mounting holes 52 through which screws, rivets, bolts or other mounting devices may be passed in order to fix the housing 50 to a mounting bracket, a device attached to a vessel or to the hull of the vessel itself. However, in some cases, the housing 50 may be affixed by welding, adhesive, snap fit or other coupling means. The housing 50 may be mounted to a portion of the vessel, or to a device attached to the vessel, that provides a relatively unobstructed view of at least the column of water beneath the vessel. Thus, for example, the housing 50 may be mounted on or near the keel (or centerline) of the vessel, on a fixed or adjustable mounting bracket that extends below a depth of the keel (or centerline) of the vessel, or on a mounting device that is offset from the bow or stern of the vessel.

FIG. 6A is a perspective view from above the housing 50. Meanwhile, FIG. 6B is a perspective view from one side of the housing 50 at a point substantially perpendicular to a longitudinal axis of the housing 50 and FIG. 6C is a perspective view from the front side of the housing 50 at a point looking straight down the longitudinal axis of the housing 50. As shown in FIGS. 6A-6C, the transducer array 36 may include a linear downscan transducer 54 and a circular downscan transducer 56. Each of the linear downscan transducer 54 and the circular downscan transducer 56 may be disposed within the housing 50 such that transmissions emanating from the linear downscan transducer 54 and the circular downscan transducer 56 are directed into the water column and toward bottom features substantially directly below the vessel. In other words, the linear downscan transducer 54 and the circular downscan transducer 56 are referred to as "downscan" transducers because each of the linear downscan transducer 54 and the circular downscan transducer 56 are directed downward relative to a surface of the body of water on which the vessel may operate.

In an exemplary embodiment, the linear downscan transducer 54 and the circular downscan transducer 56 may each be disposed to be in planes that are substantially parallel with each other and with a plane in which the longitudinal axis of the housing 50 lies. Generally speaking, the linear downscan transducer 54 and the circular downscan transducer 56 may also be displosed in line with the longitudinal axis of the housing 50. Although shown in a particular order in FIGS. 6A-6C, the ordering of the placement of the linear downscan transducer 54 and the circular downscan transducer 56 within the housing 50 may be reversed or varied in some examples. Furthermore, in some cases, the linear downscan transducer 54 and the circular downscan transducer 56 may each be located in their own respective separate housings rather than both being within a single housing.

Figure 7A:
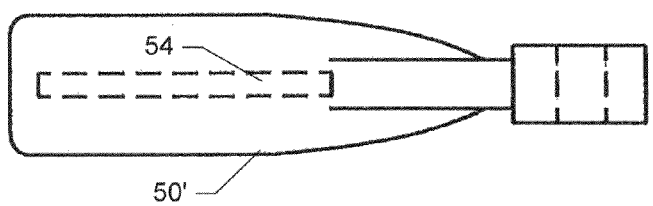
FIG. 7A is a diagram showing a perspective view of a linear downscan transducer within a single housing from a point above the housing according to an exemplary embodiment of the present invention.
Figure 7B:
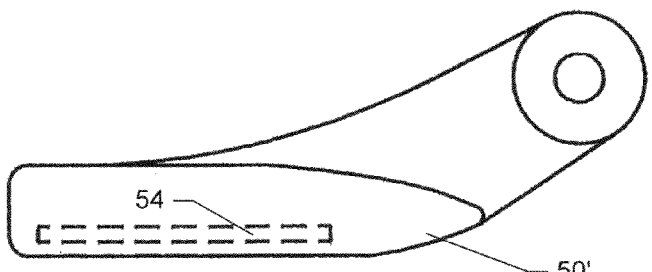
FIG. 7B is a perspective view from one side of the housing of FIG. 7A at a point substantially perpendicular to a longitudinal axis of the housing according to an exemplary embodiment of the present invention.
Figure 7C:
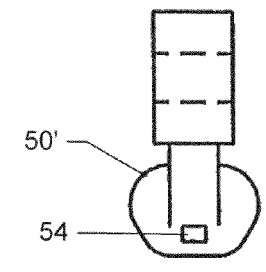
FIG. 7C is a perspective view from the front side of the housing of FIG. 7A at a point looking straight down the longitudinal axis of the housing according to an exemplary embodiment of the present invention.

In this regard, for example, in some cases the linear downscan transducer 54 may be within its own housing 50' as shown in FIG. 7 (which includes FIGS. 7A, 7B and 7C). Similarly, although not specifically shown, the circular downscan transducer 56 may be disposed within its own housing, such as a relatively cylindrically shaped housing that may be mounted near the housing 50' of the linear downscan transducer 54. As such, by way of comparison to FIG. 6, FIGS. 7A through 7C illustrate diagrams of the linear downscan transducer 54 in the housing 50' from various different perspectives. In this regard, FIG. 7A is a perspective view from above the housing 50'. Meanwhile, FIG. 7B is a perspective view from one side of the housing 50' at a point substantially perpendicular to a longitudinal axis of the housing 50' and FIG. 7C is a perspective view from the front side of the housing 50' at a point looking straight down the longitudinal axis of the housing 50'. As shown in FIGS. 7A-7C, by employing only the linear downscan transducer 54, the size of the housing 50' may be reduced. In this regard, for example, particularly FIG. 7C shows a reduction in the cross sectional size of the housing 50' as compared to the cross sectional size of the housing 50 of FIG. 6C. Thus, for example, the housing 50' may introduce less drag than the housing 50.

Figure 8A:
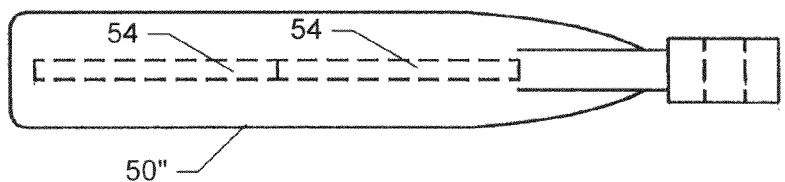
FIG. 8A is a diagram showing a perspective view of a linear downscan transducer array including two linear downscan transducers within a single housing from a point above the housing according to an exemplary embodiment of the present invention.
Figure 8B:
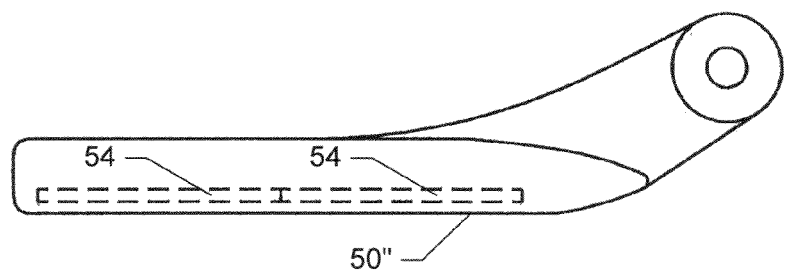
FIG. 8B is a perspective view from one side of the housing of FIG. 8A at a point substantially perpendicular to a longitudinal axis of the housing according to an exemplary embodiment of the present invention.
Figure 8C:
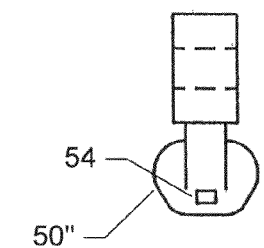
FIG. 8C is a perspective view from the front side of the housing of FIG. 8A at a point looking straight down the longitudinal axis of the housing according to an exemplary embodiment of the present invention.

As indicated above, the transducer array 36 may include one or more of the linear downscan transducer 54 and one or more of the circular downscan transducer 56. FIG. 8 (which includes FIGS. 8A, 8B and 8C) illustrates an example where multiple linear downscan tranducers are included within a housing 50" to illustrate a modification of the example shown in FIG. 7. However, in some cases, multiple linear downscan transducers could be implemented in connection with the example of FIG. 6. In other words, a single housing could include multiple linear downscan transducers and one or more circular downscan transducers.

The housing (e.g., housing 50) may include a recessed portion defining containment volume for holding transducer elements (e.g., the linear downscan transducer element 54 and the circular downscan transducer element 56). The recessed portion defining the containment volume may extend over a substantial portion of the length the housing 50. To prevent cavitation or the production of bubbles due to uneven flow over the housing 50, the housing 50 (and in particular the containment volume portion of the housing) may have a gradual rounded profile to permit laminar flow of water over the housing 50. In some examples, one or more insulated cables may provide a conduit for wiring to communicatively couple the transducer elements of the transducer array 36 to the sonar module 44.

In an exemplary embodiment, the linear downscan transducer 54 may be formed of a rectangular prism shaped crystal forming a linear transducer element. Thus, for example, the linear downscan transducer 54 may be substantially rectangular in shape and made from a piezoelectric material such as a piezoelectric ceramic material, as is well known in the art and may include appropriate shielding (not shown) as is well known in the art. The piezoelectric material being disposed in a rectangular arrangement provides for an approximation of a linear array having beamwidth characteristics that are a function of the length and width of the rectangular face of the transducer element of the linear downscan transducer 54 and the frequency of operation. In an exemplary embodiment, the linear downscan transducer 54 may be configured to operate in accordance with at least two operating frequencies. In this regard, for example, a frequency selection capability may be provided by the sonar module 44 to enable the user to select one of perhaps multiple frequencies of operation. In one example, one operating frequency may be set to about 800 kHz and another operating frequency may be set to about 455 kHz. Furthermore, the length of the transducer elements may be set to about 120 mm while the width is set to about 3 mm to thereby produce beam characteristics corresponding to a bearing fan of about 0.8 degrees by about 32 degrees at 800 kHz or about 1.4 degrees by about 56 degrees at 455 kHz. However, in general, the length and width of the linear downscan transducer 54 may be set such that the beamwidth of sonar beam produced by the linear downscan transducer 54 in a direction parallel to a longitudinal length (L) of the linear downscan transducer 54 is less than about five percent as large as the beamwidth of the sonar beam in a direction (w) perpendicular to the longitudinal length of the linear downscan transducer 54. (See generally FIG. 9.) It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped boundaries, those boundaries merely correspond to the −3 dB (or half power) points for the transmitted beams. In other words, energy measured outside of the boundaries shown is less than half of the energy transmitted. Thus, the boundaries shown are merely theoretical half power point boundaries.

Although dual frequency operations providing a specific beam fan for each respective element for given lengths are described above, it should be understood that other operating ranges could alternatively be provided with corresponding different transducer element sizes and corresponding different beamwidth characteristics. Moreover, in some cases, the sonar module 44 may include a variable frequency selector, to enable an operator to select a particular frequency of choice for the current operating conditions. However, in all cases where the longitudinal length of the linear downscan transducer 54 is generally aligned with the centerline of the vessel and the linear downscan transducer 54 is oriented to transmit pulses into the water column below the vessel, the rectangular shape of the linear downscan transducer 54 provides for a narrow beamwidth in a direction substantially parallel to the centerline of the vessel and wide beamwidth in a direction substantially perpendicular to the centerline of the vessel. However, if the transducer array 36 is mounted in a different fashion or to a rotatable accessory on the vessel (e.g., a trolling motor mount), the fan-shaped beams produced will have the wide beamwidth in a direction substantially perpendicular to the longitudinal length of the housing 50 and a narrow beamwidth in a direction substantially parallel to the longitudinal length of the housing 50 regardless of the orientation of the vessel. Thus, the sonar could also be oriented to provide fore and aft oriented fan-shaped beams or any other orientation relative to the vessel in instances where motion of the vessel is not necessarily in a direction aligned with the centerline of the vessel.

Figure 9A:
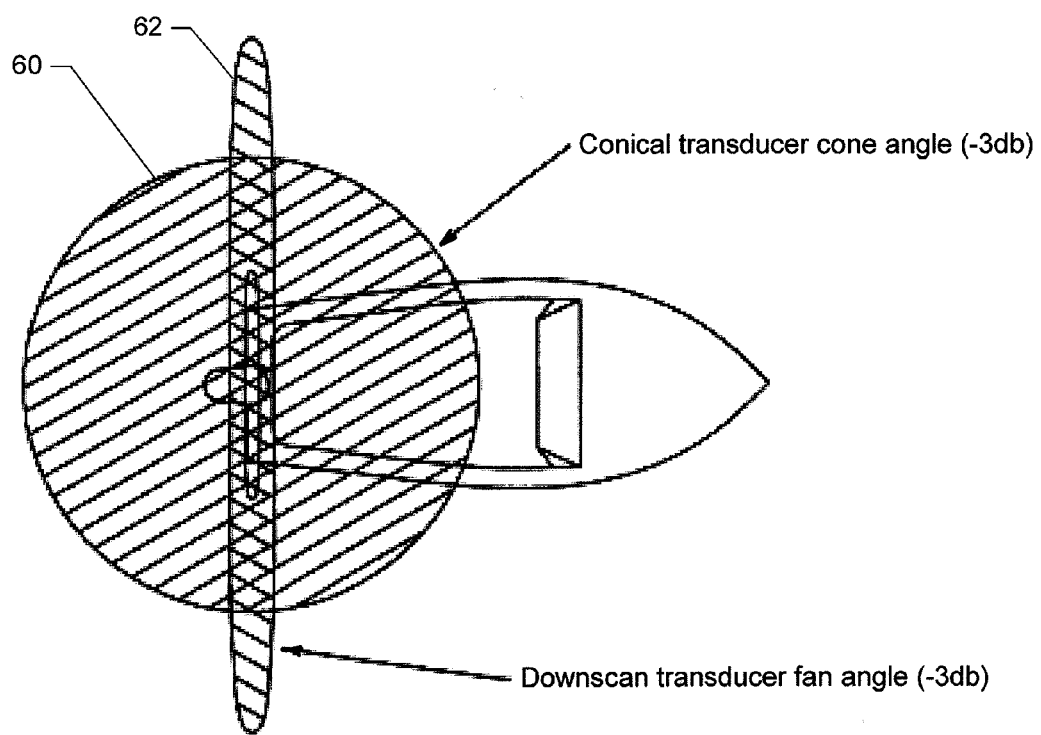
FIG. 9A illustrates an example of a top view of the beam overlap that may occur in situations where a linear downscan transducer and a circular downscan transducer are employed simultaneously according to an exemplary embodiment of the present invention.
Figure 9B:
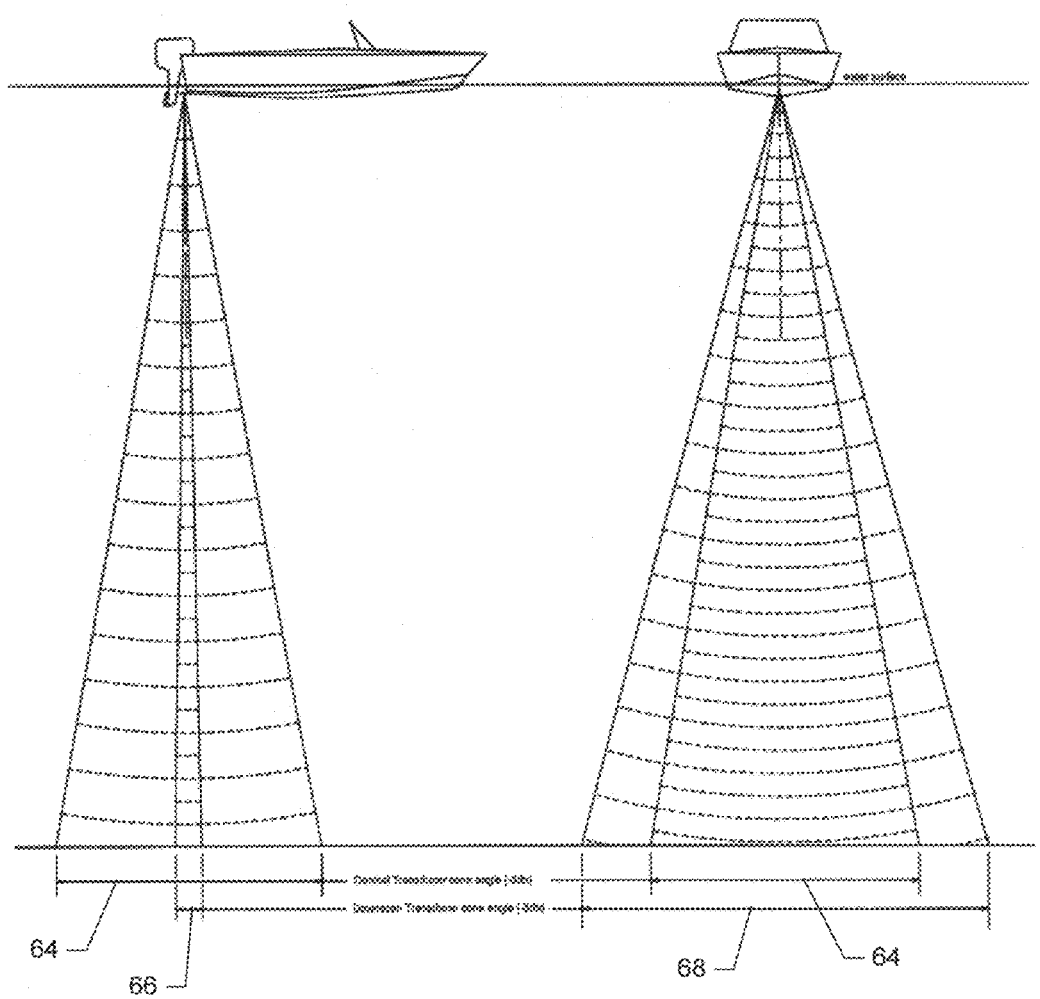
FIG. 9B shows side views of the same beam overlap shown in FIG. 9A from the starboard side of a vessel and from ahead of the bow of the vessel according to an exemplary embodiment of the present invention.

FIG. 9 (which includes FIGS. 9A and 9B) shows an illustration of the beam characteristics produced by an exemplary embodiment of the present invention. In this regard, FIG. 9A illustrates an example of a top view of the beam overlap that may occur in situations where the linear downscan transducer 54 and the circular downscan transducer 56 are employed simultaneously. FIG. 9B shows side views of the same beam overlap shown in FIG. 9A from the starboard side of a vessel (on the left side of the page) and from ahead of the bow of the vessel (on the right side of the page). As shown in FIG. 9A, there is overlap between a conical beam projection 60 showing an example coverage area of a beam produced by the circular downscan transducer 56 and a linear downscan beam projection 62 showing an example coverage area of a beam produced by the linear downscan transducer 54. The differences between the beam patterns of the linear downscan transducer 54 and the circular downscan transducer 56 are further illustrated in FIG. 9B in which it can be seen that the beamwidth 64 of the beam produced by the circular downscan transducer 56 is substantially the same regardless of the side from which the beam is viewed. However, the beamwidth 66 of the beam produced by the linear downscan transducer 54 as viewed from the starboard side of the vessel is substantially smaller than the beamwidth 68 of the beam produced by the linear downscan transducer as viewed from ahead of the bow of the vessel. Moreover, the beamwidth 68 is wider than the beamwidth 64, while the beamwidth 66 is narrower than the beamwidth 64.

Due to the differences in beamwidth, particularly in the direction parallel to the centerline of the vessel, it may take several linear downscan transducer beams to cover the same area that is covered by a single circular downscan transducer beam. However, one difference between a typical linear downscan transducer and a typical circular downscan transducer is that linear downscan transducers typically provide each new beam without any (or very little) overlap with prior beams (at least with respect to boundaries of the beams as defined by the half power points of the beams). Due to the minimal overlapping of linear downscan transducer beams, objects that show up on a display of linear downscan data are typically relatively crisp and clear. Meanwhile, conical beams from a circular downscan transducer typically overlap each other. Thus, since return data may be received from objects over multiple scans, return data often appears to be blurred to some extent. For example, fish or other suspended objects often appear as "arches" on a display of circular downscan transducer data.

The above described differences between linear and circular downscan transducer beams provide display characteristics that some may consider advantageous for each respective display. For example, the relatively cleaner lines provided by a display of linear downscan transducer data may make it easier to see bottom features such as trees, boulders or other objects even to the point where tree limbs are clearly visible in some cases. Furthermore, suspended objects such as fish or schools of fish may appear more crisply on a display of linear downscan transducer data. However, due to the narrow beamwidth of the linear downscan transducer 54 in the direction of motion of the vessel, smaller objects may be more difficult to discern in some cases. Thus, display data corresponding to a circular downscan transducer may often be more sensitive to picking up objects, and particularly smaller objects, than data corresponding to a linear downscan transducer. Additionally, many users are very familiar with reading a display of circular downscan transducer data as it has been used for a long time, while linear downscan transducers are new, so it may initially be difficult for some users to read data from a linear downscan transducer.

Figure 10:
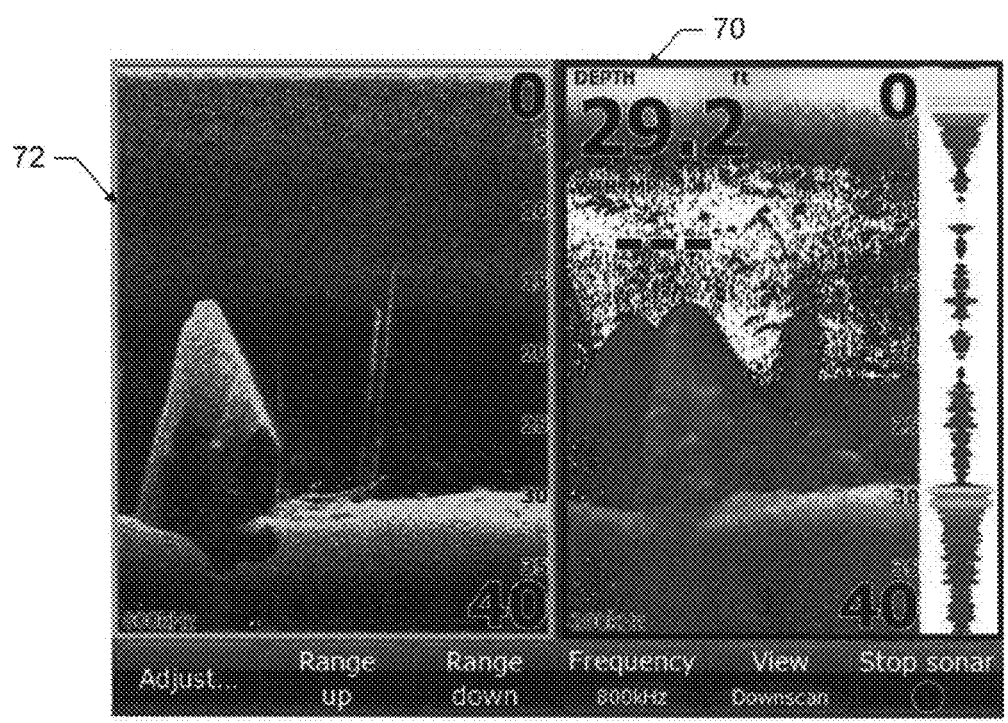
FIG. 10 illustrates the provision of separate display windows for linear and circular downscan transducer data, respectively, according to an exemplary embodiment of the present invention.

Given the characteristics described above, it may be useful to incorporate characteristics from linear downscan transducer data with characteristics from circular downscan transducer data to provide users with a display that incorporates aspects of each. Thus, for example, certain characteristics that may be seen as being advantageous from each type of data may have potential for incorporation into a single display. Users may therefore be provided with a display that is, in some cases, easier to read and provides comprehensive information regarding the water column and bottom features directly below the vessel. Although it may be possible to provide a single display with one display window showing data corresponding to a linear downscan transducer in one portion of the display and another display window corresponding to a circular downscan transducer in another portion of the display (e.g., as shown in the example of FIG. 10), it may in some cases be preferable to offer aspects of both sets of data within a single display window. In this regard, a single display window may be all that is practical for some smaller sized displays and, even on larger displays, users may prefer a more comprehensive display that provides combined data from both linear and circular downscan transducers in a single display window.

FIG. 10 illustrates the provision of separate display windows for linear and circular downscan transducer data, respectively. In this regard, display window 70 and display window 72 may each be provided on the same display (e.g., one of the displays 38). Display window 70 shows data corresponding to a circular downscan transducer (e.g., the circular downscan transducer 56). Meanwhile, display window 72 shows data corresponding to a linear downscan transducer (e.g., the linear downscan transducer 54). As discussed above, the display of the different types of data in different display windows may not always be preferable or desirable. Accordingly, some exemplary embodiments of the present invention may provide for a combination of the circular downscan transducer data and the linear downscan transducer data into a single display window.

In an exemplary embodiment, the combination of circular downscan transducer data and linear downscan transducer data into a single display window may be accomplished by the sonar module 44. To accomplish the incorporation of characteristics of both linear and circular downscan transducer data into a single display window, for example, the sonar module 44 may combine linear downscan sonar data from a linear downscan transducer with conical downscan sonar data from a circular downscan transducer. In an exemplary embodiment, the combination may be accomplished via the sonar signal processor 32. As such, for example, the sonar signal processor 32 may be programmed (either via hardware or software or a combination thereof) to combine linear downscan sonar data and the conical downscan sonar data received from the linear downscan transducer 54 and the circular downscan transducer 56, respectively. In some cases, a portion of the sonar signal processor 32 (e.g., an image processor or some other dedicated processor) may be configured to perform the combination. As such, for example, the sonar signal processor 32 is configured to receive linear downscan sonar data from a linear downscan transducer and receive conical downscan sonar data from a circular downscan transducer. The sonar signal processor 32 may then be configured to combine the linear downscan sonar data and the conical downscan sonar data to produce combined downscan sonar data displayable in a single display window.

As described above, and shown in FIG. 9, the linear downscan sonar data and the conical downscan sonar data that is ultimately combined may correspond to respective underwater regions that at least partially overlap. Moreover, due to the potential for asynchronous operation of the linear downscan transducer 54 and the circular downscan transducer 56, the sonar signal processor 32 may be further configured to synchronize the linear downscan sonar data and the conical downscan sonar data prior to the combining. Synchronization may be accomplished by sending a trigger signal at a predetermined interval. In this regard, for example, each sounding or transmission produced by either one of the linear downscan transducer 54 or the circular downscan transducer 56 may be the reference used to synchronize data corresponding to the other one of the linear downscan transducer 54 or the circular downscan transducer 56. The trigger may be operated in either direction and at any sounding interval or at any desired frequency of operation. In other words, for example, each sounding of a less frequently transmitting device may be used to trigger alignment with multiple returns of the more frequently transmitting device or a trigger may be sent every predetermined number of soundings of a more frequently transmitting device to trigger alignment with a smaller number of returns from a lower frequency transmitting device.

In an exemplary embodiment, the sonar signal processor 32 may be configured to produce the combined data for rendering at a display (e.g., one of the displays 38). The combined data may be a superposition of the linear downscan sonar data and the conical downscan sonar data. In some cases, the rendering of the combined data may include rendering base data corresponding to one of the linear downscan sonar data or the conical downscan sonar data and rendering overlay data corresponding to the other of the linear downscan sonar data or the conical downscan sonar data over the base data. In some situations, a level mask may be applied to the overlay data. In other words, for example, only overlay data that is above a predefined threshold may be rendered. In an exemplary embodiment, rather than overlaying data as described above, the sonar signal processor 32 may be configured to blend the linear downscan sonar data with the conical downscan sonar data and render the blended data. When blending is employed, the sonar signal processor 32 may be configured to apply a first weighting factor to the linear downscan sonar data to produce first weighted data and apply a second weighting factor to the conical downscan sonar data to produce second weighted data. In such situations, rendering the blended data may include combining the first weighted data and second weighted data into combined weighted data and rendering the combined weighted data.

Figure 11:
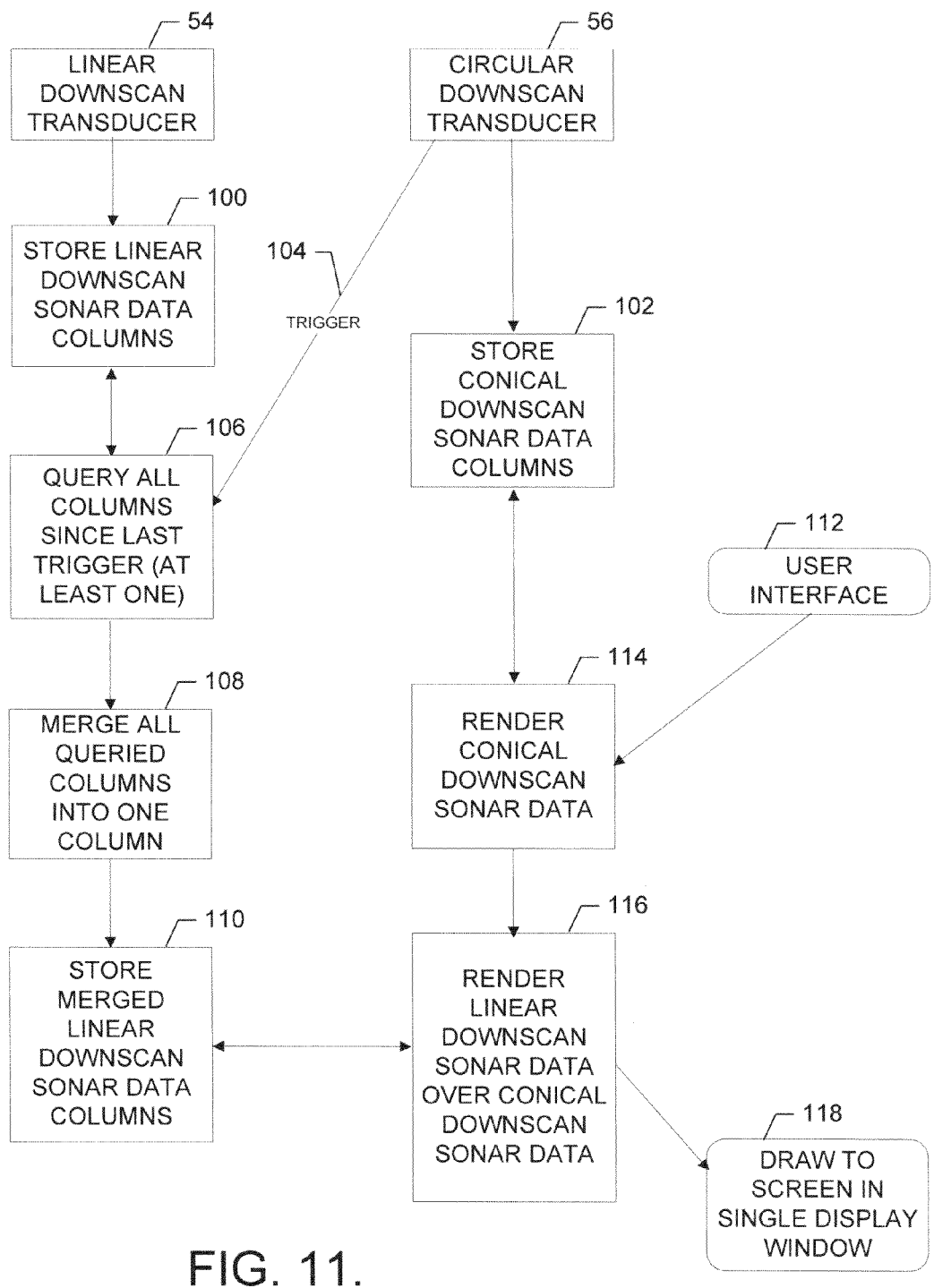
FIG. 11 illustrates a flowchart showing how superposition of linear and conical downscan sonar data may be accomplished according to an exemplary embodiment of the present invention.

FIG. 11 illustrates a flowchart showing how superposition of linear and conical downscan sonar data may be accomplished according to an exemplary embodiment. In this regard, as shown in FIG. 11, linear downscan sonar data from the linear downscan transducer 54 may be stored in columns (e.g., in a memory of or accessible to the sonar signal processor 32) at operation 100. Similarly, conical downscan sonar data may be stored in columns (e.g., in a memory of or accessible to the sonar signal processor 32) at operation 102. In some cases, the circular downscan transducer 56 may operate at a lower frequency than the linear downscan transducer 54, so in this example, each sounding of the circular downscan transducer 56 may be a trigger 104 for synchronization between the conical downscan sonar data and the linear downscan sonar data.

In this example, since multiple linear downscan sonar data columns correspond to each conical downscan sonar data column, the sonar signal processor 32 may query all columns of the stored linear downscan sonar data that have been stored since the last trigger as shown at operation 106. The queried columns, or segments of data, may then be merged into a single linear downscan sonar data column corresponding to its respective conical downscan sonar data column at operation 108. Merging of data may be accomplished by selecting a largest value for each corresponding segment of a plurality of linear downscan sonar data columns and storing the largest value for each segment to form a corresponding second data column. In an alternative embodiment, merging of data may be accomplished by averaging values for each corresponding segment of the plurality of linear downscan sonar data columns and storing an average value for each segment to form a corresponding second data column. The merged data may then be stored (e.g., in a memory of or accessible to the sonar signal processor 32) at operation 110.

At operation 112, the user may utilize the user interface to provide mode selection, sensitivity selection, color palette selection or other user inputs that may impact the rendering of the data. Mode selection could include selecting whether to render only the conical downscan sonar data in the display window, render only the linear downscan sonar data in the display window, or render the combined downscan sonar data in the display window. However, in some cases, the mode selection could also include selecting multiple windows to be simultaneously displayed such as the linear downscan sonar data on one side of the display and the conical downscan sonar data and/or combined data being displayed on another segment of the display. Mode selection could be used to select blending or level masking as described above. However, in some cases, level selection (e.g., for the mask or for blending) could be made as a sensitivity selection. For example, the user may select the predefined threshold of the level mask or may select to render blended data with conical downscan sonar data selected to receive a 70% weight and linear downscan sonar data weighted selected to receive a 30% weight. Color palette selection may be accomplished by providing color schemes from which the user may select to customize the display. For example, the user may select color coding to differentiate conical downscan sonar data from linear downscan sonar data and, within the color codings assigned to each type of data, intensity or color differences may further indicate the strength of sonar return received. Alternatively, the user may select cross-hatching, shades of gray or even black and white as color palette options to distinguish between linear downscan sonar data and conical downscan sonar data. As such, for example, the user interface may be used to control the sonar signal processor 32 with respect to rendering the combined downscan sonar data in the single display window such that return data corresponding to the linear downscan sonar data is provided with a first color scheme and return data corresponding to the conical downscan sonar data is provided with a second color scheme.

At operation 114, the conical downscan sonar data columns (e.g., the base data in this example) may be rendered and then at operation 116, the linear downscan sonar data columns (e.g., the overlay data) may be rendered over the conical downscan sonar data columns. The combined data may then be drawn to the display screen in the same display window at operation 118.

FIG. 12 (which includes FIGS. 12A, 12B and 12C) illustrates some example images that may be useful in explaining operation of an exemplary embodiment. In this regard, FIG. 12A is an image of conical downscan sonar data alone. FIG. 12B illustrates linear downscan sonar data alone. FIG. 12C illustrates combined linear and conical downscan sonar data. As shown in FIG. 12C, since the linear downscan sonar data is overlayed onto the conical downscan sonar data, there is no obscuring of either type of data. Instead, the sensitivity with respect to identifying small objects in the water column below the vessel is provided by the conical downscan sonar data and the clarity of bottom features is provided by the linear downscan sonar data. In this regard, for example, the trees so clearly visible in FIG. 12B are also shown in FIG. 12C to provide definition or further clarity with respect to these bottom features within the more blurry returns provided by the conical downscan sonar data. Specifically, in this example, the trees shown in FIG. 12B are shown in brown overlay in FIG. 12C over the red return data shown from FIG. 12A.

Figure 13A:
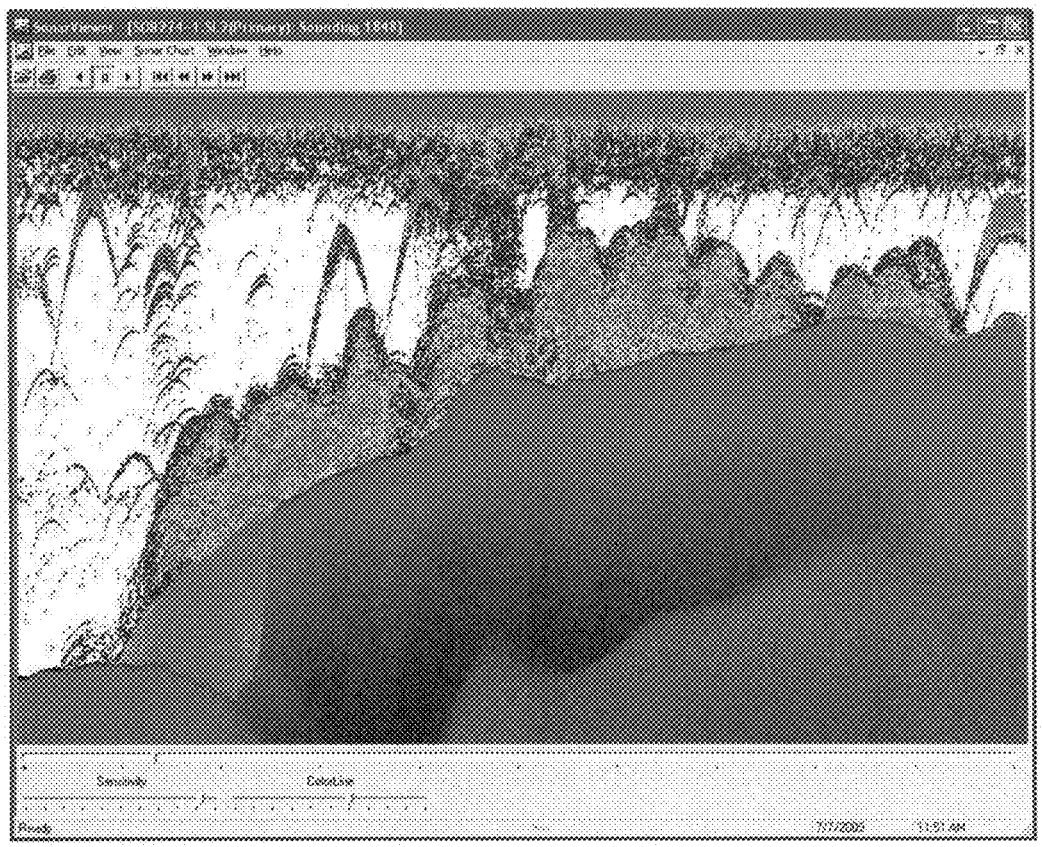
FIG. 13A is an example image of conical downscan sonar data alone according to an exemplary embodiment of the present invention.
Figure 13B:
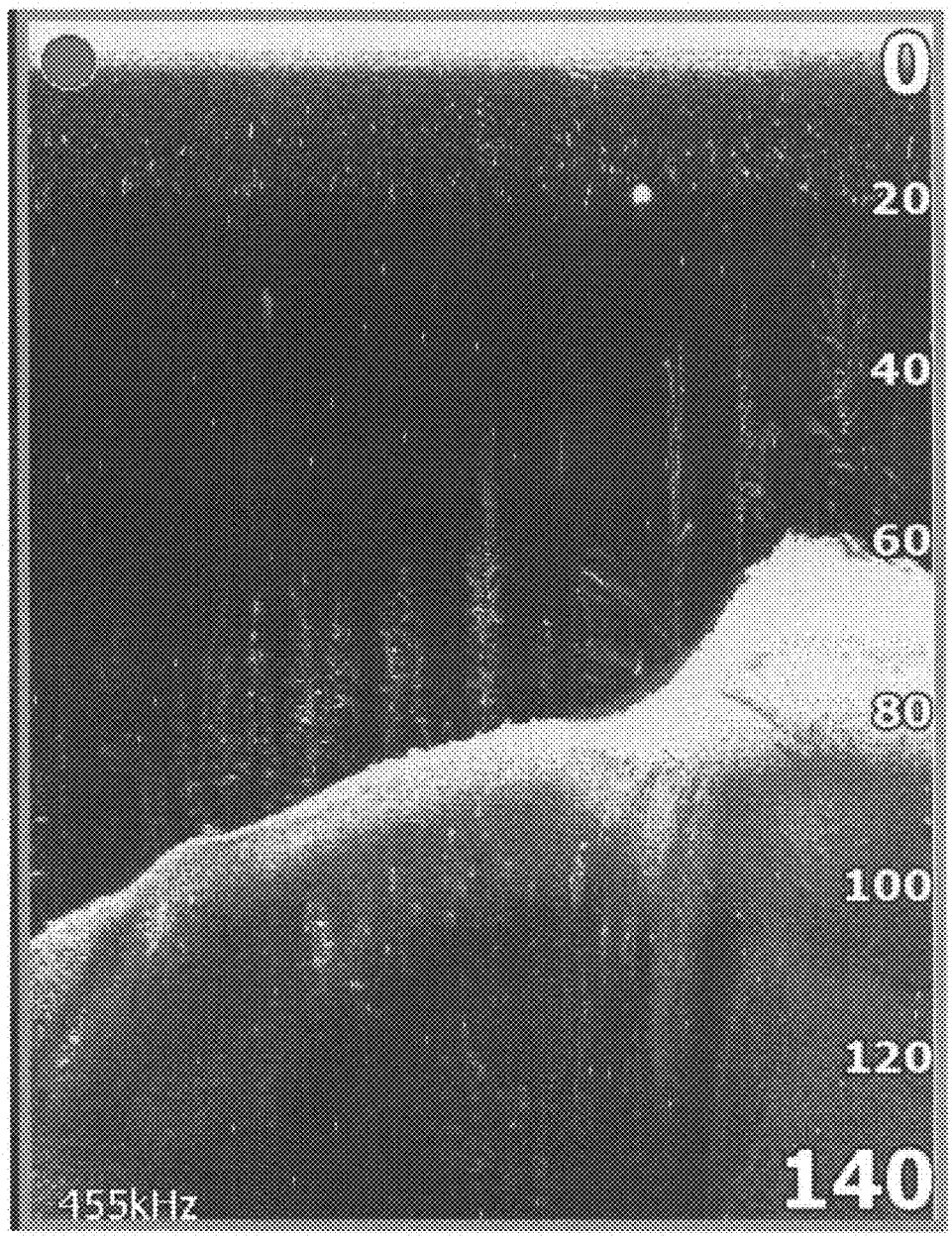
FIG. 13B illustrates linear downscan sonar data displayed alone in an example image according to an exemplary embodiment of the present invention.
Figure 13C:
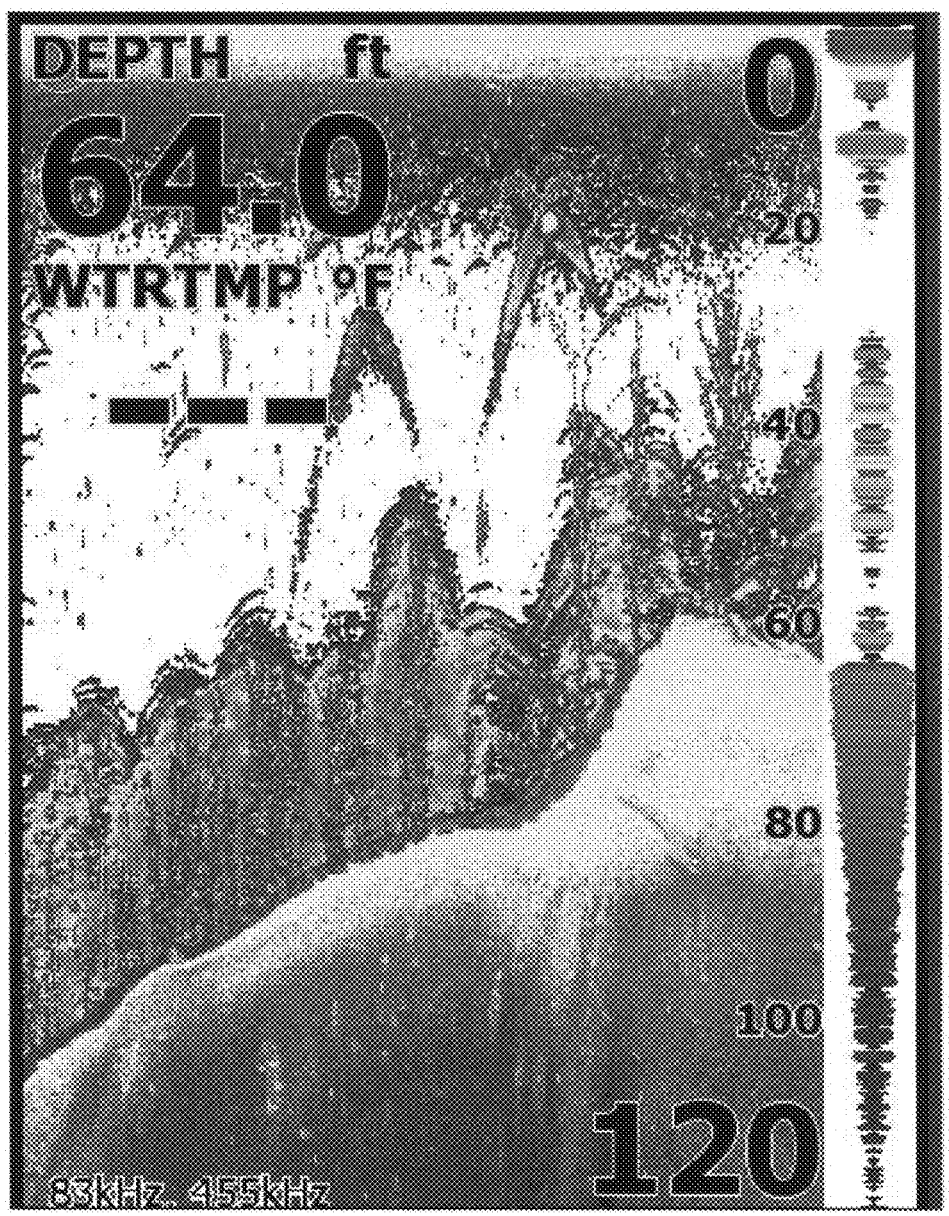
FIG. 13C illustrates combined linear and conical downscan sonar data displayed in a single display window according to an exemplary embodiment of the present invention.

FIG. 13 (which includes FIGS. 13A, 13B and 13C shows another example. In this example, FIG. 13A is an image of conical downscan sonar data alone. FIG. 13B illustrates linear downscan sonar data alone. FIG. 13C illustrates combined linear and conical downscan sonar data. As shown in FIG. 13B, the linear downscan image may be provided on a majority of the display and other information may be provided over the linear downscan image. For example, frequency information (provided at the lower left portion of the display window in this example) and a depth scale (provided on the right edge of the display in this example) may be provided to assist the user in interpreting the image displayed. As such, boat position may be represented by the numeral 0 (e.g., on the right side), or some other desirable icon, for most recent sonar pings, and older sonar data may be presented on the left side of the screen to present a scrolling image as the boat (and transducer) move through the water over time.

Figure 14:
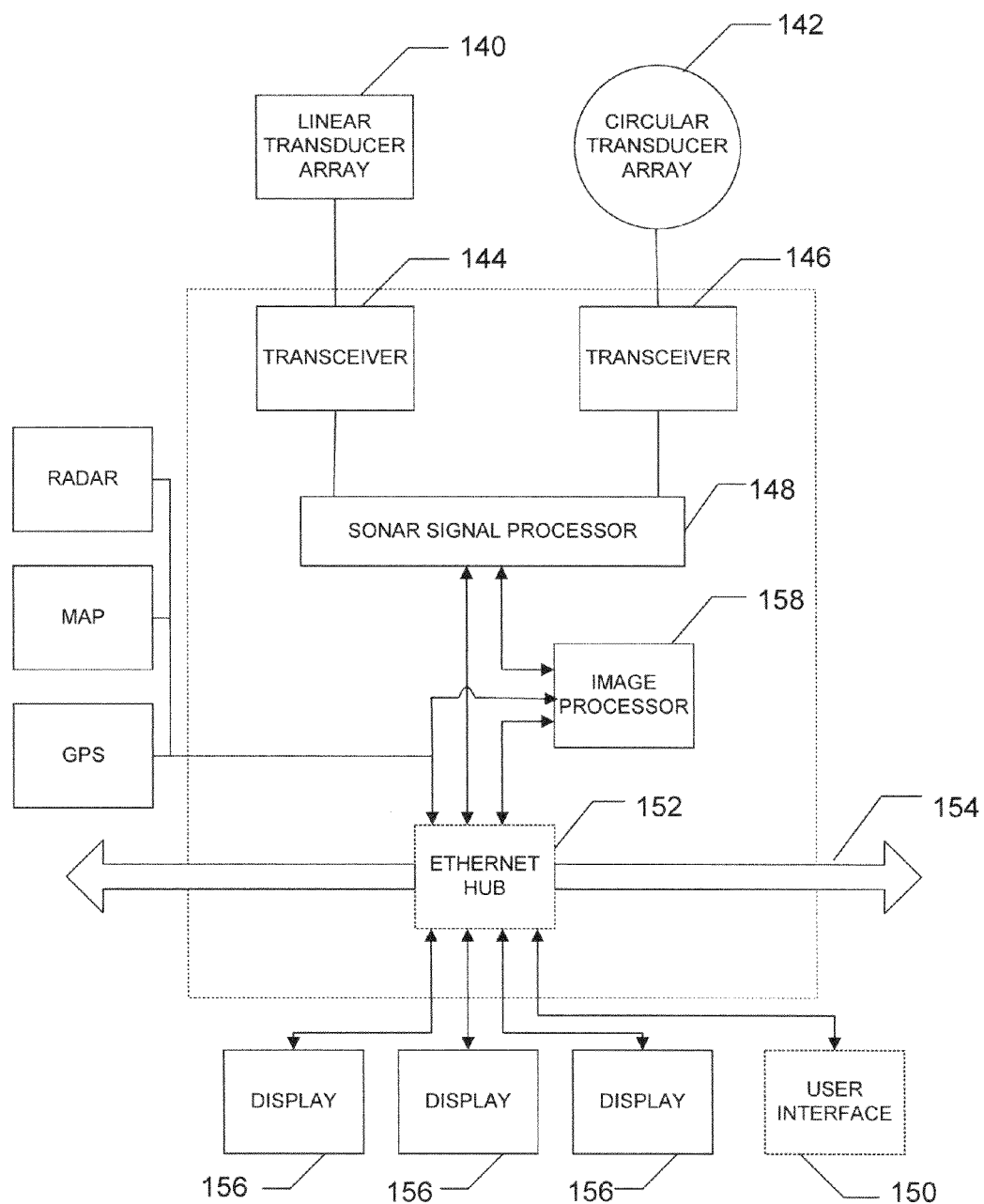
FIG. 14 is a basic block diagram illustrating a sonar system according to an exemplary embodiment of the present invention.

FIG. 14 illustrates an exemplary sonar system incorporating linear and circular downscan transducer arrays 140, 142. The two transducer arrays may be in the same or separate housings and may include one or more transducers in each respective array. The arrays also typically utilize different operational frequencies. Such may also assist in minimizing interference. Similar to the system illustrated in FIG. 5, the transducers are operationally connected to the transceivers 144, 146, which configure the transducer outputs for receipt by a sonar signal processor 148. The sonar signal processor 148 (which may be similar to the sonar signal processor 32 of FIG. 5) executes various programs stored or as may be selected by the user interface 150. The Ethernet hub 152, network 154, displays 156 and user interface 150 operate as described for the corresponding components of FIG. 5. The image processor 158 may perform a variety of functions to optimize or customize the display images, including such features as split screen to show multiple different sonar images or data. Examples include individual and separate images of GPS, waypoints, mapping, nautical charts, GPS tracking, radar, etc., which are typically shown side-by-side or stacked. Additional examples include individual data boxes, such as speed, depth, water, temperature, range or distance scales, location or waypoint, latitude, longitude, time, etc. Still further examples include composite images that combine information from one or more of these sources, such as the images from the linear downstream and circular downstream transducers to overlay the images. For example, the traditional "fish arch" image representing a possible fish using a circular downscan sonar may be imposed over a small white circle or oval representing a possible fish using a linear downscan sonar. Still further, one image may be colorized to distinguish it visibly from data representing another image. As such, for example, the images may be combined using image blending or overlay techniques. Alternatively, individual images may be presented, or different images, simultaneously on different displays without overlay. Image data packets or streams may also have additional data associated therewith, such as time of day, location, temperature, speed, GPS, etc.

Notably, the example of FIG. 14 may be simplified in some embodiments. In this regard, the radar, map and GPS modules of FIG. 14 along with the Ethernet hub 152 may not be included in some embodiments. Moreover, in one example, an embodiment of the present invention may include essentially only processing circuitry to handle inputs from a linear and circular transducer array along with a display in a single device. As such, for example, all of the electronics for handling linear and circular transducer inputs may be included along with a display within a single box, without any Ethernet connection or other peripherals.

Figure 15:
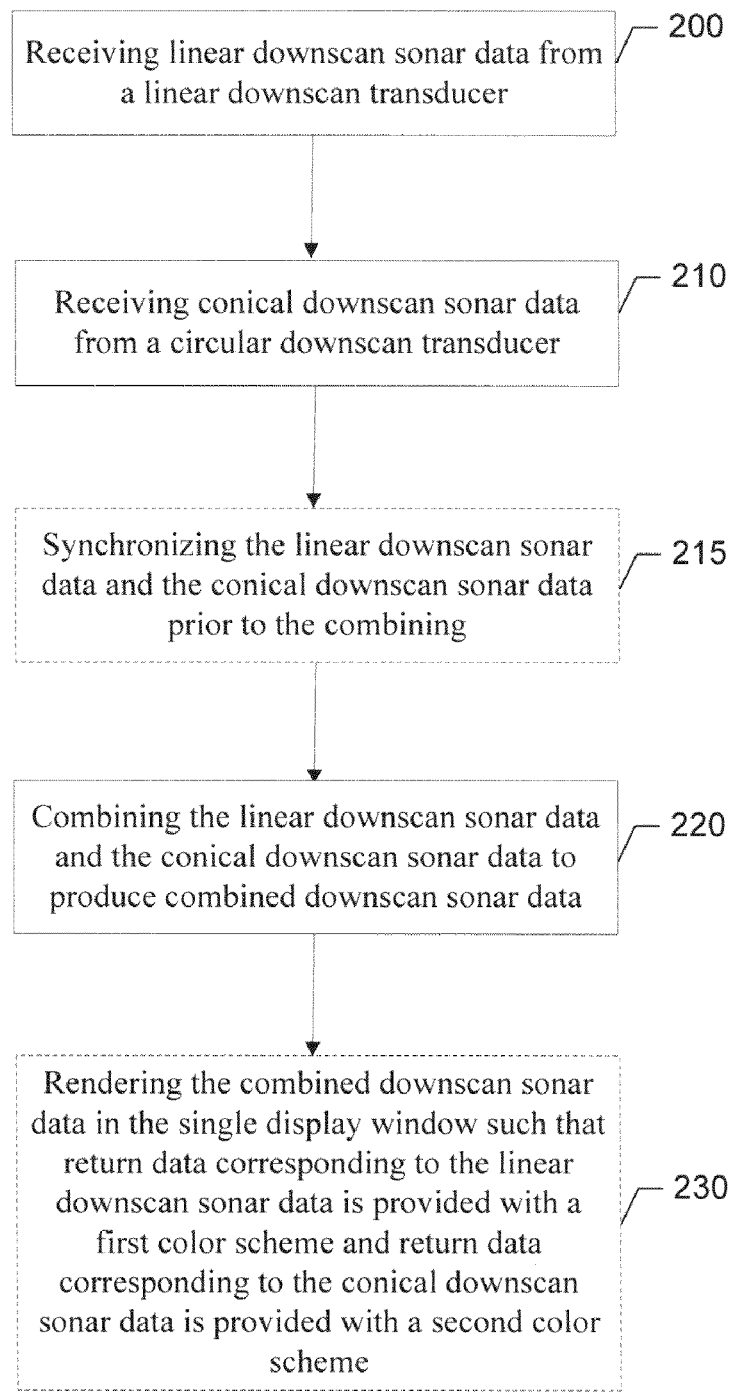
FIG. 15 is a flowchart illustrating a method of producing a combined linear and circular downscan image according to an exemplary embodiment of the present invention.

FIG. 15 is a flowchart of a system, method and program product according to an exemplary embodiment of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the sonar module and executed by a processor in the sonar module. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

As shown in FIG. 15, one embodiment of a method for providing a combined linear and circular downscan sonar display may include receiving linear downscan sonar data from a linear downscan transducer at operation 200 and receiving conical downscan sonar data from a circular downscan transducer at operation 210. The method may further include combining the linear downscan sonar data and the conical downscan sonar data to produce combined downscan sonar data at operation 220. In some cases, additional optional operations may be included, some of which are shown in dashed lines in FIG. 15. For example, the method may further include synchronizing the linear downscan sonar data and the conical downscan sonar data prior to the combining at operation 215. In some cases, the method may further include rendering the combined downscan sonar data in the single display window such that return data corresponding to the linear downscan sonar data is provided with a first color scheme and return data corresponding to the conical downscan sonar data is provided with a second color scheme at operation 230.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving linear downscan sonar data based on sonar returns from a series of fan-shaped beams produced sequentially by a linear downscan transducer mounted on a watercraft, the series of fan-shaped beams insonifying different fan-shaped regions of an underwater environment beneath the watercraft as the watercraft travels;
   receiving conical downscan sonar data based on sonar returns from a generally conical beam produced by a second downscan transducer, wherein the conical beam is wider than each fan-shaped beam in a direction parallel to a longitudinal length of the linear downscan transducer;
   combining the linear downscan sonar data and the conical downscan sonar data to produce combined downscan sonar data; and
   rendering the combined downscan sonar data as at least one image on a display, the at least one image including a composite of images of the fan-shaped regions arranged in a progressive order corresponding to the travel of the watercraft.

2. The method of claim 1, wherein receiving the linear downscan sonar data and receiving the conical downscan sonar data comprises receiving the linear downscan sonar data and the conical downscan sonar data corresponding to respective underwater regions that at least partially overlap.

3. The method of claim 1, wherein combining the linear downscan sonar data and the conical downscan sonar data comprises producing the combined downscan sonar data to be displayable in a single display window.

4. The method of claim 1, further comprising synchronizing the linear downscan sonar data and the conical downscan sonar data prior to the combining.

5. The method of claim 4, wherein synchronizing the linear downscan sonar data and the conical downscan sonar data comprises utilizing a predetermined interval of linear downscan transmissions from the linear downscan transducer as a reference for synchronization with the conical downscan sonar data.

6. The method of claim 4, wherein synchronizing the linear downscan sonar data and the conical downscan sonar data comprises utilizing a predetermined interval of downscan transmissions from the second downscan transducer as a reference for synchronization with the linear downscan sonar data.

7. The method of claim 4, wherein synchronizing the linear downscan sonar data and the conical downscan sonar data comprises utilizing a predetermined time interval as a reference for synchronization.

8. The method of claim 1, wherein the rendering step comprises rendering base data corresponding to one of the linear downscan sonar data or the conical downscan sonar data and rendering overlay data corresponding to the other of the linear downscan sonar data or the conical downscan sonar data over the base data.

9. The method of claim 8, wherein rendering overlay data corresponding to the other of the linear downscan sonar data or the conical downscan sonar data over the base data comprises applying a level mask to the overlay data and rendering only data above a predefined threshold associated with the level mask as the overlay data.

10. The method of claim 1, wherein combining the linear downscan sonar data and the conical downscan sonar data comprises blending the linear downscan sonar data with the conical downscan sonar data and rendering the blended data.

11. The method of claim 10, wherein blending the linear downscan sonar data with the conical downscan sonar data comprises applying a first weighting factor to the linear downscan sonar data to produce first weighted data and applying a second weighting factor to the conical downscan sonar data to produce second weighted data and wherein rendering the blended data comprises combining the first weighted data and second weighted data into combined weighted data and rendering the combined weighted data.

12. The method of claim 1, wherein combining the linear downscan sonar data and the conical downscan sonar data comprises:
   forming first data columns of the conical downscan sonar data;
   forming second data columns of the linear downscan sonar data corresponding to each of the first data columns; and
   rendering base data from one of the first data columns or the second data columns and rendering at least a portion of overlay data from the other of the first data columns or the second data columns over the base data.

13. The method of claim 12, wherein forming the second data columns comprises storing a plurality of linear downscan sonar data columns corresponding to each of the first data columns and merging the plurality of linear downscan sonar data columns to produce one second data column corresponding to each first data column.

14. The method of claim 13, wherein merging the plurality of linear downscan sonar data columns to produce one second data column corresponding to each first data column comprises selecting a largest value for each corresponding segment of the plurality of linear downscan sonar data columns and storing the largest value for each segment to form a corresponding second data column.

15. The method of claim 13, wherein merging the plurality of linear downscan sonar data columns to produce one second data column corresponding to each first data column comprises averaging values for each corresponding segment of the plurality of linear downscan sonar data columns and storing an average value for each segment to form a corresponding second data column.

16. The method of claim 1, wherein combining the linear downscan sonar data and the conical downscan sonar data comprises combining the linear downscan sonar data and the conical downscan sonar data based on a user selected sensitivity.

17. The method of claim 1, further comprising rendering the combined downscan sonar data in a single display window such that return data corresponding to the linear downscan sonar data is provided with a first color scheme and return data corresponding to the conical downscan sonar data is provided with a second color scheme.

18. The method of claim 17, wherein rendering the combined downscan sonar data comprises enabling user selection of a color palette for displaying return data corresponding to the linear downscan sonar data with a first color scheme and displaying return data corresponding to the conical downscan sonar data with a second color scheme.

19. The method of claim 1, further comprising enabling user selection of a rendering option corresponding to one of:
rendering only the conical downscan sonar data in a single display window;
rendering only the linear downscan sonar data in the single display window;
rendering only the combined downscan sonar data in the single display window;
rendering the conical downscan sonar data, the linear downscan sonar data and the combined downscan sonar data each in respective different display windows;
rendering the conical downscan sonar data and the linear downscan sonar data each in respective different display windows; or
rendering one of the conical downscan sonar data or the linear downscan sonar data with the combined downscan sonar data such that the combined downscan sonar data and the one of the conical downscan sonar data or the linear downscan sonar data are each provided in respective different display windows.

20. The method of claim 1, wherein the rendering step comprises creating linear downscan image data based on the linear downscan sonar data, creating conical downscan image data based on the conical downscan sonar data, and displaying both the linear downscan image data and the conical downscan sonar data for a same region beneath the watercraft.

21. The method of claim 20, wherein the linear downscan image data for said same region is displayed in a first window on a display and the conical downscan sonar data for said same region is displayed in a second window on the display.

22. The method of claim 20, wherein the linear downscan image data for said same region and the conical downscan sonar data for said same region are displayed overlaid on the display.

23. The method of claim 1, wherein the linear transducer is mounted on the watercraft with the longitudinal length of the linear transducer oriented substantially parallel to a fore-to-aft direction of the watercraft.

24. A computer program product comprising at least one non-transitory computer-readable storage medium having computer-executable program code portions stored therein, the computer-executable program code portions comprising:
program code instructions for receiving linear downscan sonar data based on sonar returns from a series of fan-shaped beams produced sequentially by a linear downscan transducer mounted on a watercraft, the series of fan-shaped beams insonifying different fan-shaped regions of an underwater environment beneath the watercraft as the watercraft travels;
program code instructions for receiving conical downscan sonar data based on sonar returns from a generally conical beam produced by a second downscan transducer, wherein the conical beam is wider than each fan-shaped beam in a direction parallel to a longitudinal length of the linear downscan transducer;
program code instructions for combining the linear downscan sonar data and the conical downscan sonar data to produce combined downscan sonar data; and
program code instructions for rendering the combined downscan sonar data as at least one image on a display, the at least one image including a composite of images of the fan-shaped regions arranged in a progressive order corresponding to the travel of the watercraft.

25. The computer program product of claim 24, wherein program code instructions for receiving the linear downscan sonar data and receiving the conical downscan sonar data include instructions for receiving the linear downscan sonar data and the conical downscan sonar data corresponding to respective underwater regions that at least partially overlap.

26. The computer program product of claim 24, wherein program code instructions for combining the linear downscan sonar data and the conical downscan sonar data includes instructions for producing the combined downscan sonar data to be displayable in a single display window.

27. The computer program product of claim 24, further comprising program code instructions for synchronizing the linear downscan sonar data and the conical downscan sonar data prior to the combining.

28. The computer program product of claim 27, wherein program code instructions for synchronizing the linear downscan sonar data and the conical downscan sonar data include instructions for utilizing a predetermined interval of linear downscan transmissions from the linear downscan transducer as a reference for synchronization with the conical downscan sonar data.

29. The computer program product of claim 27, wherein program code instructions for synchronizing the linear downscan sonar data and the conical downscan sonar data include instructions for utilizing a predetermined interval of downscan transmissions from the second downscan transducer as a reference for synchronization with the linear downscan sonar data.

30. The computer program product of claim 27, wherein program code instructions for synchronizing the linear downscan sonar data and the conical downscan sonar data includes instructions for utilizing a predetermined time interval as a reference for synchronization.

31. The computer program product of claim 24, wherein program code instructions for combining the linear downscan sonar data and the conical downscan sonar data include instructions for rendering base data corresponding to one of the linear downscan sonar data or the conical downscan sonar data and rendering overlay data corresponding to the other of the linear downscan sonar data or the conical downscan sonar data over the base data.

32. The computer program product of claim 31, wherein program code instructions for rendering overlay data corresponding to the other of the linear downscan sonar data or the conical downscan sonar data over the base data include instructions for applying a level mask to the overlay data and rendering only data above a predefined threshold associated with the level mask as the overlay data.

33. The computer program product of claim 24, wherein program code instructions for combining the linear downscan sonar data and the conical downscan sonar data include instructions for blending the linear downscan sonar data with the conical downscan sonar data and rendering the blended data.

34. The computer program product of claim 33, wherein program code instructions for blending the linear downscan sonar data with the conical downscan sonar data include instructions for applying a first weighting factor to the linear downscan sonar data to produce first weighted data and applying a second weighting factor to the conical downscan sonar data to produce second weighted data and wherein rendering the blended data comprises combining the first weighted data and second weighted data into combined weighted data and rendering the combined weighted data.

35. The computer program product of claim 24, wherein program code instructions for combining the linear downscan sonar data and the conical downscan sonar data include instructions for:
   forming first data columns of the conical downscan sonar data;
   forming second data columns of the linear downscan sonar data corresponding to each of the first data columns; and
   rendering base data from one of the first data columns or the second data columns and rendering at least a portion of overlay data from the other of the first data columns or the second data columns over the base data.

36. The computer program product of claim 35, wherein program code instructions for forming the second data columns include instructions for storing a plurality of linear downscan sonar data columns corresponding to each of the first data columns and merging the plurality of linear downscan sonar data columns to produce one second data column corresponding to each first data column.

37. The computer program product of claim 36, wherein program code instructions for merging the plurality of linear downscan sonar data columns to produce one second data column corresponding to each first data column include instructions for selecting a largest value for each corresponding segment of the plurality of linear downscan sonar data columns and storing the largest value for each segment to form a corresponding second data column.

38. The computer program product of claim 36, wherein program code instructions for merging the plurality of linear downscan sonar data columns to produce one second data column corresponding to each first data column include instructions for averaging values for each corresponding segment of the plurality of linear downscan sonar data columns and storing an average value for each segment to form a corresponding second data column.

39. The computer program product of claim 24, wherein program code instructions for combining the linear downscan sonar data and the conical downscan sonar data include instructions for combining the linear downscan sonar data and the conical downscan sonar data based on a user selected sensitivity.

40. The computer program product of claim 24, further comprising program code instructions for rendering the combined downscan sonar data in the single display window such that return data corresponding to the linear downscan sonar data is provided with a first color scheme and return data corresponding to the conical downscan sonar data is provided with a second color scheme.

41. The computer program product of claim 40, wherein program code instructions for rendering the combined downscan sonar data include instructions for enabling user selection of a color palette for displaying return data corresponding to the linear downscan sonar data with a first color scheme and displaying return data corresponding to the conical downscan sonar data with a second color scheme.

42. The computer program product of claim 24, further comprising program code instructions for enabling user selection of a rendering option corresponding to:
   rendering only the conical downscan sonar data in a single display window;
   rendering only the linear downscan sonar data in the single display window;
   rendering only the combined downscan sonar data in the single display window;
   rendering the conical downscan sonar data, the linear downscan sonar data and the combined downscan sonar data each in respective different display windows;
   rendering the conical downscan sonar data and the linear downscan sonar data each in respective different display windows; or
   rendering one of the conical downscan sonar data or the linear downscan sonar data with the combined downscan sonar data such that the combined downscan sonar data and the one of the conical downscan sonar data or the linear downscan sonar data are each provided in respective different display windows.

43. An apparatus comprising a sonar signal processor configured to:
   receive linear downscan sonar data based on sonar returns from a series of fan-shaped beams produced sequentially by a linear downscan transducer mounted on a watercraft, the series of fan-shaped beams insonifying different fan-shaped regions of an underwater environment beneath the watercraft as the watercraft travels;
   receive conical downscan sonar data based on sonar returns from a generally conical beam produced by a second downscan transducer, wherein the conical beam is wider than each fan-shaped beam in a direction parallel to a longitudinal length of the linear downscan transducer;
   combine the linear downscan sonar data and the conical downscan sonar data to produce combined downscan sonar data; and
   render the combined downscan sonar data as at least one image on a display, the at least one image including a composite of images of the fan-shaped regions arranged in a progressive order corresponding to the travel of the watercraft.

44. The apparatus of claim 43, wherein the sonar signal processor is configured to receive the linear downscan sonar data and receiving the conical downscan sonar data by receiving the linear downscan sonar data and the conical downscan sonar data corresponding to respective underwater regions that at least partially overlap.

45. The apparatus of claim 43, wherein the sonar signal processor is configured to combine the linear downscan sonar data and the conical downscan sonar data by producing the combined downscan sonar data to be displayable in a single display window.

46. The apparatus of claim 43, wherein the sonar signal processor is further configured to synchronize the linear downscan sonar data and the conical downscan sonar data prior to the combining.

47. The apparatus of claim 46, wherein the sonar signal processor is configured to synchronize the linear downscan sonar data and the conical downscan sonar data by utilizing a predetermined interval of linear downscan transmissions from the linear downscan transducer as a reference for synchronization with the conical downscan sonar data.

48. The apparatus of claim 46, wherein the sonar signal processor is configured to synchronize the linear downscan sonar data and the conical downscan sonar data by utilizing a predetermined interval of downscan transmissions from the second downscan transducer as a reference for synchronization with the linear downscan sonar data.

49. The apparatus of claim 46, wherein the sonar signal processor is configured to synchronize the linear downscan sonar data and the conical downscan sonar data by utilizing a predetermined time interval as a reference for synchronization.

50. The apparatus of claim 43, wherein the sonar signal processor is configured to combine the linear downscan sonar data and the conical downscan sonar data by rendering base data corresponding to one of the linear downscan sonar data or the conical downscan sonar data and rendering overlay data corresponding to the other of the linear downscan sonar data or the conical downscan sonar data over the base data.

51. The apparatus of claim 50, wherein the sonar signal processor is configured to render overlay data corresponding to the other of the linear downscan sonar data or the conical downscan sonar data over the base data by applying a level mask to the overlay data and rendering only data above a predefined threshold associated with the level mask as the overlay data.

52. The apparatus of claim 43, wherein the sonar signal processor is configured to combine the linear downscan sonar data and the conical downscan sonar data by blending the linear downscan sonar data with the conical downscan sonar data and rendering the blended data.

53. The apparatus of claim 52, wherein the sonar signal processor is configured to blend the linear downscan sonar data with the conical downscan sonar data by applying a first weighting factor to the linear downscan sonar data to produce first weighted data and applying a second weighting factor to the conical downscan sonar data to produce second weighted data and wherein rendering the blended data comprises combining the first weighted data and second weighted data into combined weighted data and rendering the combined weighted data.

54. The apparatus of claim 43, wherein the sonar signal processor is configured to combine the linear downscan sonar data and the conical downscan sonar data by:
forming first data columns of the conical downscan sonar data;
forming second data columns of the linear downscan sonar data corresponding to each of the first data columns; and
rendering base data from one of the first data columns or the second data columns and rendering at least a portion of overlay data from the other of the first data columns or the second data columns over the base data.

55. The apparatus of claim 54, wherein the sonar signal processor is configured to form the second data columns by storing a plurality of linear downscan sonar data columns corresponding to each of the first data columns and merging the plurality of linear downscan sonar data columns to produce one second data column corresponding to each first data column.

56. The apparatus of claim 55, wherein the sonar signal processor is configured to merge the plurality of linear downscan sonar data columns to produce one second data column corresponding to each first data column by selecting a largest value for each corresponding segment of the plurality of linear downscan sonar data columns and storing the largest value for each segment to form a corresponding second data column.

57. The apparatus of claim 55, wherein the sonar signal processor is configured to merge the plurality of linear downscan sonar data columns to produce one second data column corresponding to each first data column by averaging values for each corresponding segment of the plurality of linear downscan sonar data columns and storing an average value for each segment to form a corresponding second data column.

58. The apparatus of claim 43, wherein the sonar signal processor is configured to combine the linear downscan sonar data and the conical downscan sonar data by combining the linear downscan sonar data and the conical downscan sonar data based on a user selected sensitivity.

59. The apparatus of claim 43, wherein the sonar signal processor is further configured to render the combined downscan sonar data in the single display window such that return data corresponding to the linear downscan sonar data is provided with a first color scheme and return data corresponding to the conical downscan sonar data is provided with a second color scheme.

60. The apparatus of claim 59, wherein the sonar signal processor is configured to render the combined downscan sonar data by enabling user selection of a color palette for displaying return data corresponding to the linear downscan sonar data with a first color scheme and displaying return data corresponding to the conical downscan sonar data with a second color scheme.

61. The apparatus of claim 59, wherein the sonar signal processor is configured to render the combined downscan sonar data by enabling user selection of a color palette for displaying return data corresponding to the linear downscan sonar data with a first shading or cross-hatching scheme and displaying return data corresponding to the conical downscan sonar data with a second shading or cross-hatching scheme.

62. The apparatus of claim 43, wherein the sonar signal processor is further configured to enable user selection of a rendering option corresponding to:
rendering only the conical downscan sonar data in a single display window;
rendering only the linear downscan sonar data in the single display window;
rendering only the combined downscan sonar data in the single display window;
rendering the conical downscan sonar data, the linear downscan sonar data and the combined downscan sonar data each in respective different display windows;
rendering the conical downscan sonar data and the linear downscan sonar data each in respective different display windows; or
rendering one of the conical downscan sonar data or the linear downscan sonar data with the combined downscan sonar data such that the combined downscan sonar data and the one of the conical downscan sonar data or the linear downscan sonar data are each provided in respective different display windows.

63. The apparatus of claim 43, wherein the sonar signal processor is part of a sonar module in a single housing.

64. The apparatus of claim 63, wherein the sonar module includes multiple operating frequencies.

65. The apparatus of claim 63, wherein the housing is mountable to a watercraft.

66. The apparatus of claim 63, wherein the sonar module includes a single transceiver serving multiple transducers.

67. The apparatus of claim 63, wherein the sonar module includes multiple linear transducers.

68. The apparatus of claim 63, wherein the sonar module includes multiple circular transducers.

69. The apparatus of claim 43, further comprising a display configured to display images representing sonar signals.

70. The apparatus of claim 69, wherein the display is configured to render different images on the same display.

71. The apparatus of claim 43, wherein the linear downscan transducer provides one or more of depth, water column features and bottom data.

72. The apparatus of claim 43, wherein the linear downscan transducer and the second downscan transducer are within a same housing.

73. The apparatus of claim 72, wherein the housing has a streamlined shape.

74. The apparatus of claim 43, wherein the linear downscan transducer and the second downscan transducer provide data simultaneously.

75. The apparatus of claim 43, further comprising a display and a sonar module including the sonar signal processor, the display and the sonar module being within a same housing.

76. The apparatus of claim 75, wherein the display is configured to render data from sources of data including at least one of the group of radar, GPS, digital mapping, time and temperature.

77. The apparatus of claim 75, wherein a display format for the display is user selectable.

78. The apparatus of claim 43, wherein the second transducer is circular.

79. The apparatus of claim 43, further comprising a transducer assembly comprising said linear downscan transducer and said second downscan transducer disposed in a housing that is mountable to a watercraft, wherein said linear downscan transducer and said second downscan transducer are oriented to both insonify a same region beneath the watercraft.

80. The apparatus of claim 79, wherein the linear downscan transducer is oriented to insonify a first region beneath the watercraft that is relatively narrow in a direction parallel to a longitudinal length of the linear downscan transducer and relatively wide in a direction transverse to the longitudinal length, and the second downscan transducer is oriented to insonify a second region beneath the watercraft that is wider than the first region in said direction parallel to the longitudinal length of the linear downscan transducer.

81. The apparatus of claim 80, wherein the linear downscan transducer and the second downscan transducer are oriented such that the first and second regions at least partially overlap.

* * * * *